(12) United States Patent
Kim

(10) Patent No.: US 10,539,827 B2
(45) Date of Patent: Jan. 21, 2020

(54) DISPLAY DEVICE AND METHOD FOR MANUFACTURING THE SAME

(71) Applicant: Samsung Display Co., Ltd., Yongin-si, Gyeonggi-do (KR)

(72) Inventor: Sung Woon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/129,509

(22) Filed: Sep. 12, 2018

(65) Prior Publication Data
US 2019/0094624 A1   Mar. 28, 2019

(30) Foreign Application Priority Data

Sep. 27, 2017  (KR) .................. 10-2017-0125206

(51) Int. Cl.
G02F 1/1335 (2006.01)
G02F 1/1333 (2006.01)
G02F 1/1343 (2006.01)

(52) U.S. Cl.
CPC .. *G02F 1/133617* (2013.01); *G02F 1/133512* (2013.01); *G02F 1/133514* (2013.01);
(Continued)

(58) Field of Classification Search
CPC ...... G02F 1/1333; G02F 1/1335; G02F 1/136; G02F 1/133617; G02F 1/133514; G02F 1/133512; G02F 1/133528; G02F 1/133621; G02F 1/134309; G02F 1/133603; G02F 1/1368; G02F 1/133345; G02F 1/1336; G02F 1/133504; G02F 1/133602; G02F 1/133615; G02F 1/136227; G02F 1/1343; G02F 1/1362; G02F 1/136209; G02F 2001/133614; G02F 2001/133548; G02F 2001/133357; G02F 2001/01791; G02F 2001/133521; G02F 2001/133562; G02F 2001/134345; G02F 2001/1635; G02F 2202/36; G02F 2202/046; G02F 2201/123;
(Continued)

(56) References Cited

U.S. PATENT DOCUMENTS 5,869,929 A * 2/1999 Eida ...................... H01L 27/322
313/461
7,649,594 B2 1/2010 Kim et al.
2013/0303777 A1 * 11/2013 Okamoto .............. C07F 15/002
548/103

* cited by examiner

*Primary Examiner* — Thoi V Duong
(74) *Attorney, Agent, or Firm* — Lewis Roca Rothgerber Christie LLP

(57) ABSTRACT

A display device and a method of manufacturing a display device are provided. A display device includes a first substrate, sub-pixel electrodes adjacent to each other on the first substrate, a second substrate positioned opposite to the first substrate, a light-transmitting pattern on the second substrate and at least partially overlapping with the first sub-pixel electrode, a wavelength conversion pattern on the second substrate, a first black matrix filling a separation space between a side surface of the light-transmitting pattern and a side surface of a first wavelength conversion pattern and including a first surface facing the first substrate and a second surface facing the second substrate, and the first surface of the first black matrix is wider than the second surface of the first black matrix, and a first surface of a second wavelength conversion pattern is wider than a second surface of the second wavelength conversion pattern.

20 Claims, 18 Drawing Sheets

(52) U.S. Cl.
CPC ............... *G02F 1/134309* (2013.01); *G02F 2001/133357* (2013.01); *G02F 2001/134345* (2013.01); *G02F 2201/123* (2013.01)

(58) Field of Classification Search
CPC ........... G02F 2201/52; G02F 2203/055; G02F 2203/01; G02F 2203/05; H01L 27/322; H01L 27/14621; H01L 27/3211; H01L 27/3216; H01L 27/3218; H01L 27/3244; H01L 27/3262; H01L 33/504; H01L 33/502; H01L 33/50; H01L 33/06; H01L 2933/0041; H01L 51/5284; H01L 2251/5369; H01L 2924/12041; G03F 7/0007; G03F 7/004; G02B 6/0026; C09K 11/06

See application file for complete search history.

DISPLAY DEVICE AND METHOD FOR MANUFACTURING THE SAME

CROSS-REFERENCE TO RELATED APPLICATION

This application claims priority to and the benefit of Korean Patent Application No. 10-2017-0125206, filed on Sep. 27, 2017 in the Korean Intellectual Property Office, the entire disclosure of which is incorporated herein by reference.

BACKGROUND

1. Field

Aspects of the present disclosure relate to a display device and a method for manufacturing the same.

2. Description of the Related Art

Along with the development of multimedia, display devices are increasing in importance. In response to this, several kinds of display devices, such as a liquid crystal display (LCD) and an organic light emitting display (OLED), have been used.

Among the display devices, an LCD, which is one of the most widely used flat panel display devices, is composed of two substrates having electric field generation electrodes, such as a pixel electrode and a common electrode formed thereon, and a liquid crystal layer interposed between the two substrates, and displays an image by applying a voltage to the electric field generation electrodes to generate an electric field in the liquid crystal layer, determining orientations of liquid crystal molecules of the liquid crystal layer, and controlling polarization of incident light.

A method of arranging a color conversion pattern for each pixel along a light path from a light source to a viewer can be exemplified as one method of allowing each pixel to uniquely represent a basic color. For example, a color filter may realize a basic color by selectively transmitting only a specific wavelength band of incident light.

SUMMARY

According to aspects of embodiments of the present disclosure, a display device includes a black matrix disposed between a side surface of a light-transmitting pattern and a side surface of a wavelength conversion pattern to enhance efficiency of light incident onto the wavelength conversion pattern, and a manufacturing method thereof is provided.

According to further aspects of embodiments of the present disclosure, a display device is configured to provide flatness to a planarization layer by disposing a black matrix in a separation space between a light-transmitting pattern and a wavelength conversion pattern, and a manufacturing method thereof is provided.

It should be noted that aspects of the present disclosure are not limited to the above-described aspects, and other aspects of the present disclosure will be apparent to those skilled in the art from the following description.

According to an aspect of one or more embodiments of the inventive concept, a display device comprises a first substrate, first to third sub-pixel electrodes adjacent to each other on the first substrate, a second substrate positioned opposite to the first substrate, a light-transmitting pattern on the second substrate and at least partially overlapping with the first sub-pixel electrode, the light-transmitting pattern including a first surface facing the first substrate and a second surface facing the second substrate, a wavelength conversion pattern on the second substrate and including a first surface facing the first substrate and a second surface facing the second substrate, the wavelength conversion pattern including a first wavelength conversion pattern at least partially overlapping with the second sub-pixel electrode and a second wavelength conversion pattern at least partially overlapping with the third sub-pixel electrode, a first black matrix filling a separation space between a side surface of the light-transmitting pattern and a side surface of the first wavelength conversion pattern and including a first surface facing the first substrate and a second surface facing the second substrate, and a planarization layer on the wavelength conversion pattern, the light-transmitting pattern, and the first black matrix, wherein the first surface of the first black matrix is wider than the second surface of the first black matrix, and wherein the first surface of the second wavelength conversion pattern is wider than the second surface of the second wavelength conversion pattern.

According to another aspect of one or more embodiments of the inventive concept, a method of manufacturing a display device comprises forming a light-transmitting pattern configured to transmit first wavelength band light on a substrate, forming a first wavelength conversion pattern on the substrate not to overlap with the light-transmitting pattern and configured to receive the first wavelength band light and convert the first wavelength band light into second wavelength band light having a different wavelength band from the first wavelength band light, forming a black matrix to fill a separation space between a side surface of the light-transmitting pattern and a side surface of the first wavelength conversion pattern, and forming a second wavelength conversion pattern between the light-transmitting pattern and the first wavelength conversion pattern and configured to receive the first wavelength band light and convert the first wavelength band light into third wavelength band light having a different wavelength band from the first wavelength band light and the second wavelength band light, wherein the second wavelength conversion pattern includes a first surface facing the substrate and a second surface opposite to the first surface, and wherein the second surface is wider than the first surface.

BRIEF DESCRIPTION OF THE DRAWINGS

The above and other aspects and features of the present disclosure will become more apparent by describing in further detail some exemplary embodiments thereof with reference to the attached drawings, in which.

DETAILED DESCRIPTION

Figure 1:
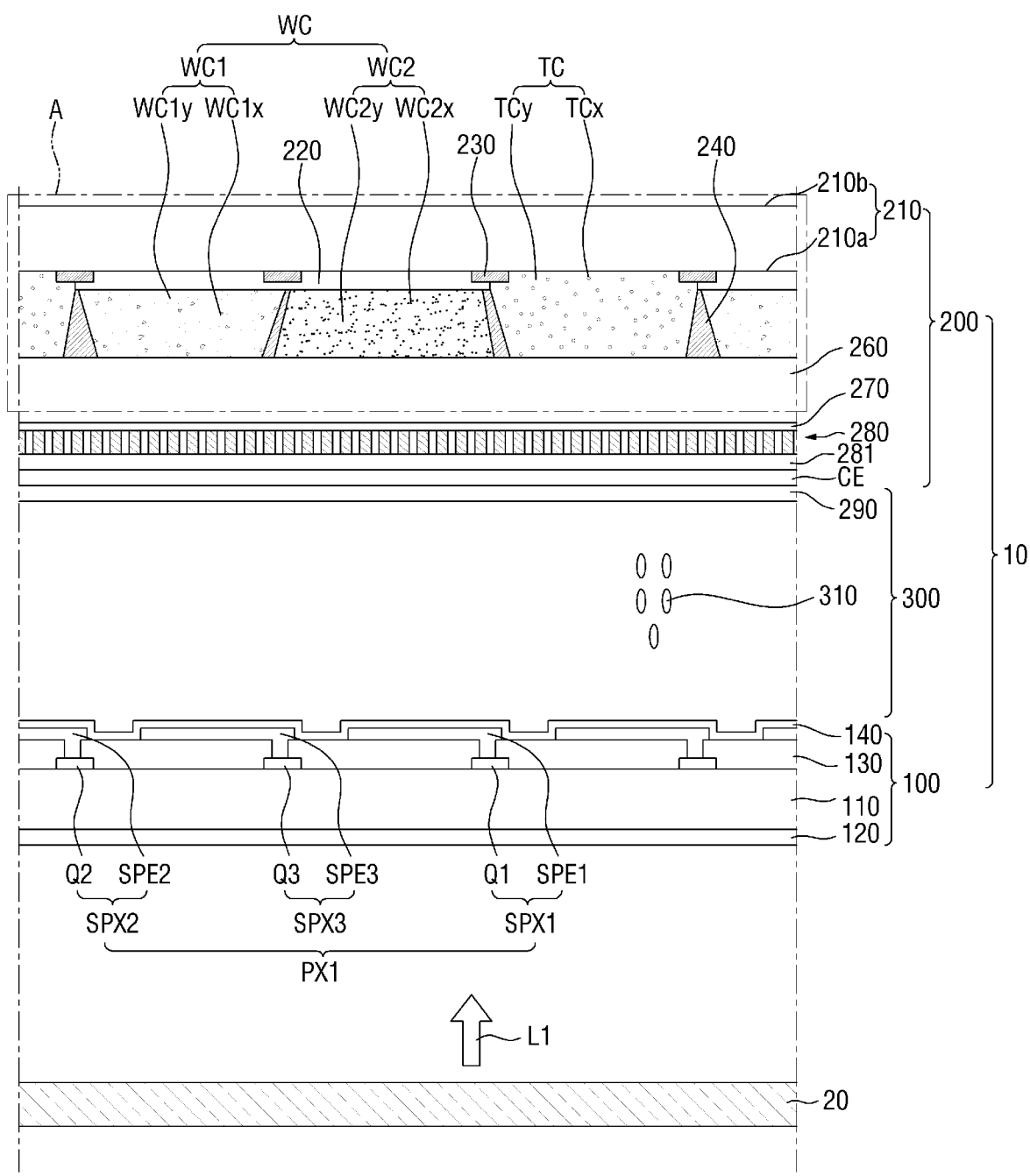
FIG. 1 is a cross-sectional view showing a display device according to an embodiment of the present disclosure.

In the following description, for the purpose of explanation, numerous details are set forth in order to provide a thorough understanding of various exemplary embodiments. It is to be understood, however, that various exemplary embodiments may be practiced without these specific details or with one or more equivalent arrangements. In instances, well-known structures and devices may be shown in block diagram form in order to avoid unnecessarily obscuring various exemplary embodiments.

In the accompanying figures, the sizes and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or one or more intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a "first" element, component, region, layer, and/or section discussed below could be termed a "second" element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments may be described herein with reference to cross-sectional illustrations that are schematic illustrations of idealized exemplary embodiments and/or intermediate structures. As such, variations from the shapes of the illustrations as a result, for example, of manufacturing techniques and/or tolerances, may be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not necessarily intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and are not to be interpreted in an idealized or overly formal sense, unless expressly so defined herein.

Herein, some embodiments of the present disclosure will be described with reference to the accompanying drawings.

FIG. 1 is a cross-sectional view showing a display device according to an embodiment of the present disclosure.

Referring to FIG. 1, a display device 1 according to an embodiment of the present disclosure includes a display panel 10 and a backlight unit 20.

The display panel 10 displays an image. The display panel 10 may include a lower display board 100, an upper display board 200, and a liquid crystal layer 300. Here, the terms "lower" and "upper" are for convenience of description and with reference to FIG. 1. The lower display board 100 may be disposed to face the upper display board 200. The liquid crystal layer 300 may be interposed between the lower display board 100 and the upper display board 200 and may include a plurality of liquid crystal molecules 310. As an example, the lower display board 100 and the upper display board 200 may be bonded through sealing.

The backlight unit 20 provides light to the display panel 10. In more detail, the backlight unit 20 may be disposed under the display panel 10 and configured to provide light having a specific wavelength to the display panel 10. Herein, the light provided from the backlight unit 20 to the display panel 10 is referred to as first wavelength band light L1.

The backlight unit 20 may emit and provide the first wavelength band light L1 to the display panel 10. Here, the first wavelength band light L1 is defined as light indicating a first color. As an example, the first color may be a blue color having a center wavelength ranging from about 420 nm to about 480 nm. The center wavelength may be represented as a peak wavelength. In other words, the first wavelength band light L1 is defined as blue light having a center wavelength in a range from about 420 nm to about 480 nm. That is, in an embodiment, the backlight unit 20 may provide blue light to the display panel 10. The display panel 10 is disposed along an optical path of the first wavelength band light L1 emitted from the backlight unit 20 and having a first wavelength band to display an image on the basis of the provided light. When the display panel 10 is disposed along an optical path through which light is provided from the backlight unit 20, the disposition relationship between the display panel 10 and the backlight unit 20 is not limited to that shown in FIG. 1.

The backlight unit 20 may include a light source configured to emit the light and a light guide plate configured to guide light provided from the light source and provide the light to the display panel 10. The type of the light source is not particularly limited. As an example, the light source may include a light emitting diode (LED) or a laser diode (LD). The material of the light guide plate is not particularly limited. As an example, the light guide plate may be made of glass, quartz, or a plastic material, such as polyethylene terephthalate or polycarbonate.

Although not shown, the backlight unit 20 may include at least one optical sheet. In an embodiment, the optical sheet may include at least one of a prism sheet, a diffusion sheet, a lenticular lens sheet, and a microlens sheet. The optical sheet may modulate optical characteristics, for example, condensing, diffusion, scattering, or polarization characteristics of the light emitted from the backlight unit 20, thus improving the display quality of the display device.

The lower display board 100, the upper display board 200, and the liquid crystal layer 300 will be described in further detail below.

First, the lower display board 100 will be described. In an embodiment, the lower display board 100 may include a lower substrate 110, a first polarizing layer 120, a plurality of pixel units including a first pixel unit PX1, a first insulating layer 130, and a lower alignment film 140.

The lower substrate 110 may be, as an example, a transparent insulating substrate. Here, the transparent insulating substrate may include a glass material, a quartz material, or a transparent plastic material. As an example, the lower substrate 110 may have flexibility.

The first polarizing layer 120 may be disposed along an optical path between the lower substrate 110 and the backlight unit 20. As an example, the first polarizing layer 120 may be disposed under the lower substrate 110. However, the disposition position of the first polarizing layer 120 is not limited to that shown in FIG. 1. As an example, the first polarizing layer 120 may be disposed between the lower substrate 110 and the liquid crystal layer 300. As an example, the first polarizing layer 120 may be a reflective polarizing layer. When the first polarizing layer 120 is a reflective polarizing layer, the first polarizing layer 120 may transmit a polarization component parallel to a transmission axis and may reflect a polarization component parallel to a reflection axis.

As an example, the first polarizing layer 120 may be in direct contact with the lower substrate 110. That is, the first polarizing layer 120 may be formed on a surface of the lower substrate 110 through a continuous process. As another example, the first polarizing layer 120 may be combined with a surface of the lower substrate 110 through a separate adhesive member. Here, as an example, the adhesive member may be a pressure sensitive adhesive member (pressure sensitive adhesive (PSA)) or an optical clear adhesive member (optical clear adhesive (OCA) or optical clear resin (OCR)).

The plurality of pixel units including the first pixel unit PX1 may be disposed on the lower substrate 110. The plurality of pixel units will be described below on the basis of the first pixel unit PX1.

The first pixel unit PX1 may include first to third sub-pixel units SPX1, SPX2, and SPX3. Here, the first to third sub-pixel units SPX1, SPX2, and SPX3 may display different colors. The first to third sub-pixel units SPX1, SPX2, and SPX3 may each include a switching device and a sub-pixel electrode. This will be described with reference to FIG. 2 on the basis of the first sub-pixel unit SPX1.

Figure 2:
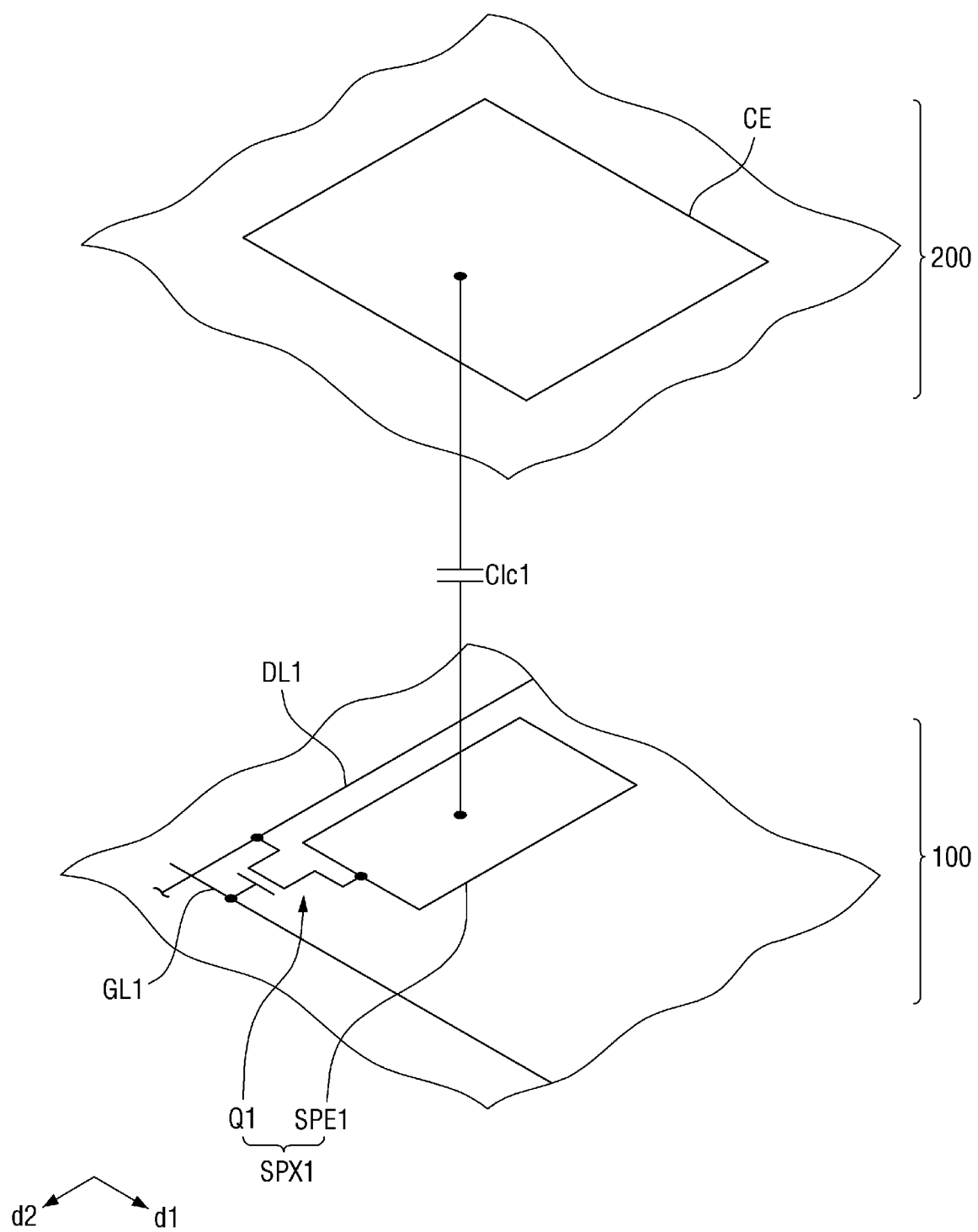
FIG. 2 is a diagram schematically showing a first sub-pixel unit of the display device shown in FIG. 1.

FIG. 2 is a diagram schematically showing the first sub-pixel unit shown in FIG. 1.

Referring to FIGS. 1 and 2, as an example, a first switching device Q1 may be a three-terminal element, such as a thin film transistor. The first switching device Q1 may have a control electrode electrically connected with a first scan line GL1 and an electrode electrically connected with a first data line DL1. The other electrode of the first switching device Q1 may be electrically connected with a first sub-pixel electrode SPE1. As an example, the first scan line GL1 may extend in a first direction d1. As an example, the first data line DL1 may extend in a second direction d2 different from the first direction d1. The first direction d1 intersects with the second direction d2.

The first switching device Q1 may be turned on according to a scan signal provided from the first scan line GL1 to provide a data signal provided from the first data line DL1 to the first sub-pixel electrode SPE1. In this disclosure, the first sub-pixel unit SPX1 has been described as including only the first switching device Q1 as a switching device, but is not limited thereto. That is, the first sub-pixel unit SPX1 may include two or more switching devices.

The first sub-pixel electrode SPE1 may be disposed on the lower display board 100. In more detail, the first sub-pixel electrode SPE1 may be disposed on the first insulating layer 130 positioned on the lower substrate 110. A common electrode CE may be positioned on the upper display board 200, which will be described below. The first sub-pixel electrode SPE1 may at least partially overlap with the common electrode CE. Thus, the first sub-pixel unit SPX1 may further include a first liquid crystal capacitor Clc1 formed by the common electrode CE overlapping with the first sub-pixel electrode SPE1. In this disclosure, the phrase "two elements overlap with each other" denotes that the two elements overlap vertically with respect to the lower substrate 110 unless specifically stated otherwise.

Referring to FIG. 1, the first insulating layer 130 may be disposed on first to third switching devices Q1, Q2, and Q3. The first insulating layer 130 electrically insulates an element disposed under the first insulating layer 130 from an element disposed on the first insulating layer 130.

As an example, the first insulating layer 130 may be formed of an inorganic material such as silicon nitride or silicon oxide. As another example, the first insulating layer 130 may include an organic material having excellent planarization characteristics and photosensitivity. As still another example, the first insulating layer 130 may be formed as a multi-layered structure composed of an organic material layer and an inorganic material layer. The first insulating layer 130 may include a plurality of contact holes for electrically connecting the first to third switching devices Q1, Q2, and Q3 to the first to third sub-pixel electrodes SPE1, SPE2, and SPE3, respectively.

The first to third sub-pixel electrodes SPE1, SPE2, and SPE3 may be disposed adjacent to each other on the first insulating layer 130. As an example, each of the first to third sub-pixel electrodes SPE1, SPE2, and SPE3 may be formed as a transparent electrode or a semi-transparent electrode or may be formed of a reflective metal, such as aluminum, silver, chromium, or an alloy thereof. Here, the transparent electrode or the semi-transparent electrode may include one or more selected from the group consisting of indium tin oxide (ITO), indium zinc oxide (IZO), zinc oxide (ZnO), indium oxide ($In_2O_3$), indium gallium oxide (IGO), and aluminum zinc oxide (AZO). Although not shown, the first to third sub-pixel electrodes SPE1, SPE2, and SPE3 may include a plurality of slits.

The lower alignment film 140 may be disposed on the first to third sub-pixel electrodes SPE1, SPE2, and SPE3. The lower alignment film 140 may induce an initial alignment of the plurality of liquid crystal molecules 310 in the liquid crystal layer 300. As an example, the lower alignment film 140 may include an organic polymer material having an imide group in a repeating unit of a main chain.

Next, the upper display board 200 will be described with reference to FIGS. 3 to 5.

Figure 3:
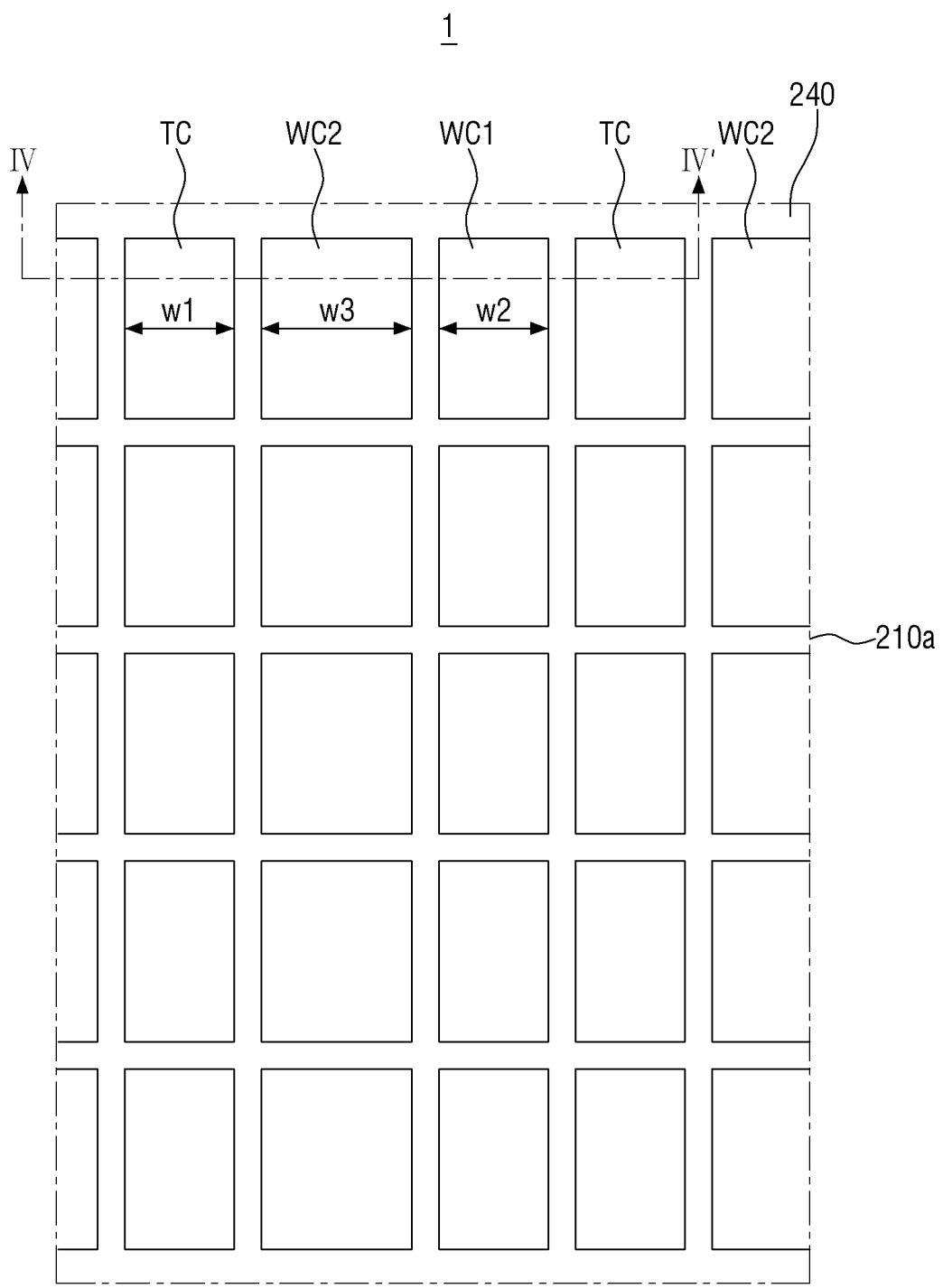
FIG. 3 is a diagram showing an optical transmission pattern of an upper display board, when viewed from the top, according to an embodiment.

FIG. 3 is a diagram showing an optical transmission pattern of an upper display board, when viewed from the top, according to an embodiment. FIG. 4 is a rear view of a region "A" of FIG. 1 and also a cross-sectional view taken along the line IV-IV' of FIG. 3. FIG. 5 is a rear view of the region "A" of FIG. 1 and also a diagram showing a case in which a second black matrix is not present.

Figure 4:
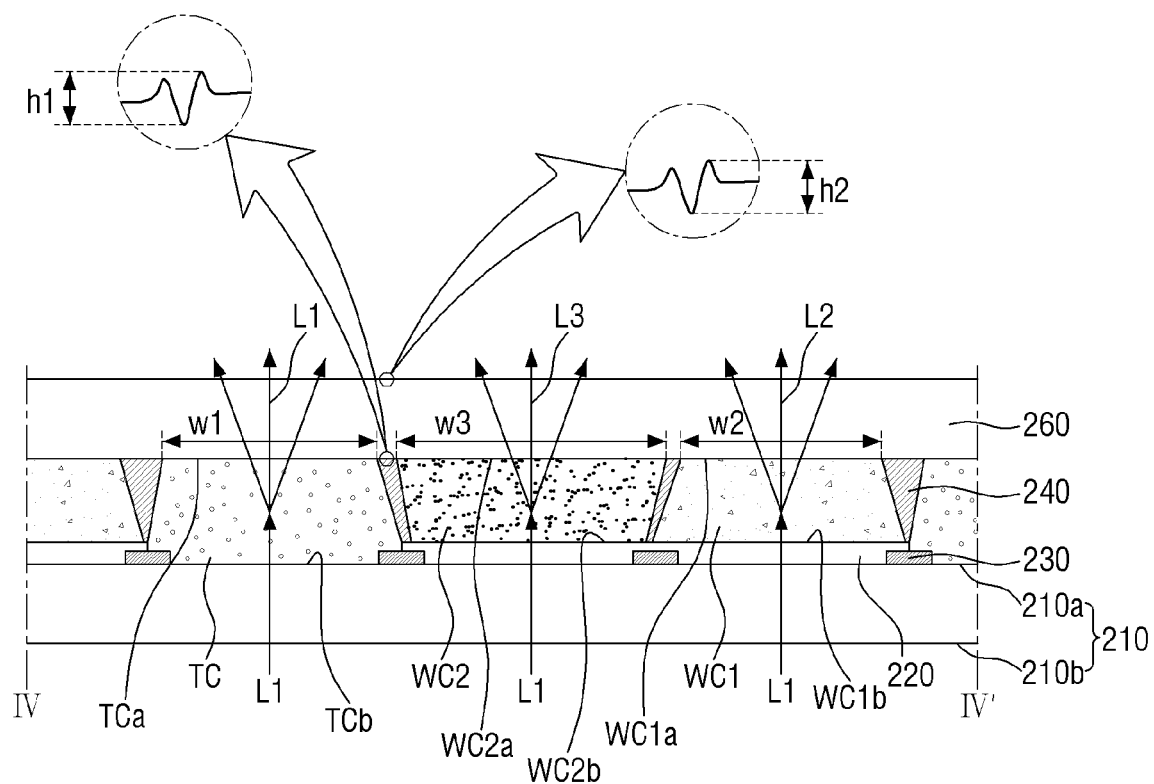
FIG. 4 is a rear view of a region "A" of FIG. 1 and also a cross-sectional view taken along the line IV-IV' of FIG. 3.

Referring to FIGS. 1, 3, and 4, the upper display board 200 may include an upper substrate 210, a first black matrix 230, a wavelength conversion pattern WC, a light-transmitting pattern TC, a color filter layer 220, a planarization layer 260, a second insulating layer 270, a second polarization layer 280, the common electrode CE, and an upper alignment film 290.

The upper substrate 210 is disposed opposite to the lower substrate 110. In an embodiment, the upper substrate 210 may be formed of transparent glass or plastic. As an example, the upper substrate 210 may be formed of a same material as that of the lower substrate 110.

The first black matrix 230 may be disposed on the upper substrate 210. The first black matrix 230 may be disposed at a boundary between the plurality of pixel units and configured to block light transmission to prevent or substantially prevent color crosstalk between adjacent pixel units. Referring to FIG. 1, the first black matrix 230 may be disposed at a boundary between the first to third sub-pixel units SPX1, SPX2, and SPX3. The material of the first black matrix 230 is not particularly limited as long as the material is capable of blocking transmission of light provided to the first black matrix 230. As an example, the first black matrix 230 may include an organic material or a metal material, such as chromium.

Although not shown, a protective layer may be disposed on the first black matrix 230. In more detail, the protective layer may be disposed between the first black matrix 230 and the color filter layer 220, which will be described below. The protective layer is capable of preventing or substantially preventing the first black matrix 230 from being damaged or corroded during a process of manufacturing the upper display board 200. The material of the protective layer is not particularly limited. For example, the material may include an inorganic insulating material, such as silicon nitride or silicon oxide. However, the protective layer may be omitted.

Although not shown, a black matrix may also be disposed on the lower display board 100. When a black matrix is disposed on the lower display board 100, the black matrix may be disposed between the first insulating layer 130 and the lower alignment film 140, as an example. The black matrix disposed on the lower display board 100 can prevent or substantially prevent light scattered by the light-transmitting pattern TC from flowing to the wavelength conversion pattern WC, thereby suppressing an occurrence of color crosstalk.

In this disclosure, the expression "a third element is disposed between a first element and a second element" means that the disposition of the third element differs depending on the disposition of the first element and the second element. That is, this means that when the first element and the second element overlap vertically to the lower substrate 110, the third element overlaps with the first element and the second element vertically to the lower substrate 110. On the contrary, when the first element and the second element overlap horizontally to the lower substrate 110, the third element overlaps with the first element and the second element horizontally to the lower substrate 110. In addition, the vertical direction and the horizontal direction may include a direction substantially vertical to the lower substrate 110 and a direction substantially horizontal to the lower substrate 110, respectively. For example, a second black matrix 240, which will be described below, is disposed between the light-transmitting pattern TC, a first wavelength conversion pattern WC1, and a second wavelength conversion pattern WC2 which overlap substantially horizontally to the lower substrate 110. This means that the second black matrix 240 is disposed to overlap with the light-transmitting pattern TC, the first wavelength conversion pattern WC1, and the second wavelength conversion pattern WC2 horizontally to the lower substrate 110.

The color filter layer 220 may be disposed on the first black matrix 230. In more detail, the color filter layer 220 may be disposed on the first black matrix 230 to overlap with the wavelength conversion pattern WC. Also, the color filter layer 220 may not overlap with the light-transmitting pattern TC.

As an example, the color filter layer 220 may include an organic material having photosensitivity. As an example, the color filter layer 220 may have a thickness in a range from about 0.5 µm to about 2 µm or in a range from about 0.5 µm to about 1.5 µm. When the thickness of the color filter layer 220 is greater than or equal to 0.5 µm, it is possible to assign sufficient absorption capacity for light of a specific wavelength band. When the thickness of the color filter layer 220 is less than or equal to 2 µm, it is possible to minimize or reduce a step height formed by the color filter layer 220. As an example, the thickness of the color filter layer 220 may be 1.2 µm.

The color filter layer 220 may be a cut-off filter that transmits light of a specific wavelength band and cuts off light of another specific wavelength band different from the specific wavelength band. This will be described below along with the wavelength conversion pattern WC.

When the color filter layer 220 overlaps with the wavelength conversion pattern WC, the disposition of the color filter layer 220 is not limited to that shown in FIG. 1. For example, the color filter layer 220 and the first black matrix 230 may be disposed on the same layer. As another example, the first black matrix 230 may be disposed on the color filter layer 220.

The wavelength conversion pattern WC and the light-transmitting pattern TC may be disposed on the first black matrix 230 and the color filter layer 220. The light-transmitting pattern TC may be disposed on the upper substrate 210 to overlap with a first sub-pixel vertically to the lower substrate 110. In more detail, the light-transmitting pattern TC may have a first surface in contact with the upper substrate 210 and a side surface arranged on the first black matrix 230.

The side surface of the light-transmitting pattern TC may be disposed to be inclined with respect to the upper substrate 210. Referring to FIG. 4, the light-transmitting pattern TC may have a cross-sectional width that progressively decreases in a direction from the upper substrate 210 toward the planarization layer 260. That is, the light-transmitting pattern TC may have a trapezoidal shape which has a width decreasing in a direction from the upper substrate 210 toward the planarization layer 260.

The side surface of the light-transmitting pattern TC may have an inclination angle in a range from 50° to 90°. When the inclination angle of the side surface of the light-transmitting pattern TC is greater than or equal to 50°, the area of a side facing the planarization layer 260 may increase sufficiently such that light emitted from the backlight unit 20 may be incident onto the area. In order for the second black matrix 240, which will be described below, to be disposed along the side surface of the light-transmitting pattern TC, there is a need for a slope sufficient to prevent the second black matrix 240 from falling down by gravity. In this regard, the slope of the side surface of the light-transmitting pattern TC may be less than or equal to 90°.

The side surface of the light-transmitting pattern TC may have a greater inclination angle than a side surface of the first wavelength conversion pattern WC1, which will be described below. That is, the light-transmitting pattern TC may have a steeper side surface than the first wavelength conversion pattern WC1 with respect to the upper substrate 210. However, the present disclosure is not limited thereto, and the side surface of the light-transmitting pattern TC may have an inclination angle substantially equal to or less than that of the side surface of the first wavelength conversion pattern WC1.

The light-transmitting pattern TC may transmit light incident from an external source without converting a color thereof. The light-transmitting pattern TC may receive the first wavelength band light L1 from the above-described backlight unit 20 and may transmit the first wavelength band light L1 without converting or shifting a center wavelength thereof. The light-transmitting pattern TC may include a light-scattering material TCx and a first light-transmitting resin TCy.

The light-scattering material TCx may scatter light diffused in the first light-transmitting resin TCy and provided to the light-transmitting pattern TC and then may emit the scattered light. In more detail, the light-transmitting pattern TC may scatter the first wavelength band light L1 provided from the backlight unit 20 and then emit the scattered light. That is, the light-transmitting pattern TC may receive blue light and then transmit the received light without change.

The light-scattering material TCx may scatter incident light in several directions irrespective of an incident angle and emit the scattered light. Here, the emitted light may be unpolarized. That is, the light-scattering material TCx may scatter the first wavelength band light L1 provided from the backlight unit 20 in several directions irrespective of an incident angle without converting a center wavelength thereof. Thus, it is possible to improve lateral visibility of the display device according to an embodiment of the present disclosure.

As an example, the light-scattering material TCx may be a material having a different refractive index from that of the first light-transmitting resin TCy. Also, the light-scattering material TCx is not particularly limited as long as the material is capable of scattering incident light. For example, the light-scattering material TCx may be a metal oxide or organic particles. The metal oxide may include titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$), or the like. The organic material may include an acrylic resin, a urethane resin, or the like.

As an example, the first light-transmitting resin TCy may be a transparent light-transmitting resin. The first light-transmitting resin TCy is not particularly limited as long as the resin is a transparent material that does not generate light absorption and affect wavelength conversion performance of a first wavelength conversion material WC1$x$. For example, the first light-transmitting resin TCy may include an organic material, such as an epoxy resin, an acryl resin, or the like.

The wavelength conversion pattern WC may be disposed on the color filter layer 220. The wavelength conversion pattern WC and the color filter layer 220 may overlap vertically to the lower substrate 110.

The wavelength conversion pattern WC may include the first wavelength conversion pattern WC1 and the second wavelength conversion pattern WC2.

The first wavelength conversion pattern WC1 may be disposed on the color filter layer 220 to overlap with the second sub-pixel electrode SPE2 vertically to the lower substrate 110. The first wavelength conversion pattern WC1 is disposed adjacent to a side surface of the light-transmitting pattern TC.

The second wavelength conversion pattern WC2 may be disposed on the color filter layer 220 to overlap with the third sub-pixel electrode SPE3 vertically to the lower substrate 110. The second wavelength conversion pattern WC2 may be disposed between the light-transmitting pattern TC and the first wavelength conversion pattern WC1. Shapes of the first wavelength conversion pattern WC1 and the second wavelength conversion pattern WC2 will be described below.

The wavelength conversion pattern WC may include a material capable of converting or shifting a wavelength band of light provided from an external source. Thus, the wavelength conversion pattern WC may convert a display color of emitted light such that the display color is different from that of light incident onto the wavelength conversion pattern WC.

The first wavelength conversion pattern WC1 may receive the first wavelength band light L1 from the above-described backlight unit 20, convert or shift a center wavelength thereof, and emit the light having the converted or shifted center wavelength to the outside. The light having the center wavelength converted by the first wavelength conversion pattern WC1 is referred to as second wavelength band light L2.

The second wavelength band light L2 indicates a second color different from the first color. Here, as an example, the second color may be a red color having a center wavelength in a range from about 600 nm to about 670 nm. That is, the second wavelength band light L2 may be defined as red light having a center wavelength in a range from about 600 nm to about 670 nm. Accordingly, in an embodiment, the first wavelength conversion pattern WC1 may receive blue light from the backlight unit 20 and convert the blue light into red light.

The second wavelength conversion pattern WC2 may receive the first wavelength band light L1 from the above-described backlight unit 20, convert or shift a center wavelength thereof, and emit the light having the converted or shifted center wavelength to the outside. The light having the center wavelength converted by the second wavelength conversion pattern WC2 is referred to as third wavelength band light L3. The third wavelength band light L3 indicates a third color different from the first and second colors. Here, as an example, the third color may be a green color having a center wavelength in a range from about 500 nm to about 570 nm. That is, the third wavelength band light L3 may be defined as green light having a center wavelength in a range from about 500 nm to about 570 nm. Accordingly, in an embodiment, the second wavelength conversion pattern WC2 may receive blue light from the backlight unit 20 and convert the blue light into green light.

First, the first wavelength conversion pattern WC1 will be described in further detail. The first wavelength conversion pattern WC1 may include a first wavelength conversion material WC1$x$ and a second light-transmitting resin WC1$y$.

The first wavelength conversion material WC1$x$ may be a material capable of converting the first wavelength band light L1 into the second wavelength band light L2. As an example, the first wavelength conversion material WC1$x$ may be a first quantum dot. The particle size of the first quantum dot is not particularly limited as long as the first wavelength conversion material WC1$x$ is capable of converting the first wavelength band light L1 into the second wavelength band light L2.

The first quantum dot may have a core-shell structure. The core may be a nanocrystalline semiconductor material. As an example, the core of the first quantum dot may be selected from among group II-VI compounds, group III-V compounds, group IV-VI compounds, group IV elements, group IV compounds, and combinations thereof.

In an embodiment, the group II-VI compounds may be selected from the group consisting of two-element compounds selected from the group consisting of CdSe, CdTe, ZnS, ZnSe, ZnTe, ZnO, HgS, HgSe, HgTe, MgSe, MgS, and mixtures thereof; three-element compounds selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixtures thereof; and four-element compounds selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and mixtures thereof.

In an embodiment, the group III-V compounds may be selected from the group consisting of two-element compounds selected from the group consisting of GaN, GaP, GaAs, GaSb, AlN, AlP, AlAs, AlSb, InN, InP, InAs, InSb, and mixtures thereof; three-element compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and mixtures thereof; and four-element compounds selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and mixtures thereof.

In an embodiment, the group IV-VI compounds may be selected from the group consisting of two-element compounds selected from the group consisting of SnS, SnSe, SnTe, PbS, PbSe, PbTe, and mixtures thereof; three-element compounds selected from the group consisting of SnSeS, SnSeTe, SnSTe, PbSeS, PbSeTe, PbSTe, SnPbS, SnPbSe, SnPbTe, and mixtures thereof; and four-element compounds selected from the group consisting of SnPbSSe, SnPbSeTe, SnPbSTe, and mixtures thereof. The group IV elements may be selected from the group consisting of Si, Ge, and mixtures thereof. The group IV compounds may be two-element compounds selected from the group consisting of SiC, SiGe, and mixtures thereof.

In an embodiment, the two-element compounds, the three-element compounds, or the four-element compounds may be present at a uniform concentration in a particle or may be present in a partially different concentration distribution in the same particle. Also, the two-element compounds, the three-element compounds, or the four-element compounds may have a core-shell structure in which one quantum dot surrounds another quantum dot. In an embodiment, an interface between the core and the shell may have a concentration gradient in which the concentration of elements present in the shell decreases toward the center thereof.

The first wavelength conversion material WC1$x$ may be naturally coordinated and diffused in the second light-transmitting resin WC1$y$. As an example, the second light-transmitting resin WC1$y$ may be a transparent light-transmitting resin. The second light-transmitting resin WC1$y$ and the above-described first light-transmitting resin TC$y$ may be made of a same material or different materials.

Next, the second wavelength conversion pattern WC2 will be described in further detail below.

The second wavelength conversion pattern WC2 may include a second wavelength conversion material WC2$x$ and a third light-transmitting resin WC2$y$.

The second wavelength conversion material WC2$x$ may be a material capable of converting the first wavelength band light L1 into the third wavelength band light L3. As an example, the second wavelength conversion material WC2$x$ may include a second quantum dot. The particle size of the second quantum dot is not particularly limited as long as the second wavelength conversion material WC2$x$ is capable of converting the first wavelength band light L1 into the third wavelength band light L3. As an example, the core of the second quantum dot may be selected from among group II-VI compounds, group III-V compounds, group IV-VI compounds, group IV elements, group IV compounds, and combinations thereof. Examples of the compounds or elements overlaps with the description of the first quantum dot, and thus a description thereof will be omitted.

The second wavelength conversion material WC2$x$ may be naturally coordinated and diffused in the third light-transmitting resin WC2$y$. A description of the third light-transmitting resin WC2$y$ overlaps with the description of the second light-transmitting resin WC1$y$, and thus will be omitted.

The second wavelength band light L2 emitted from the first wavelength conversion pattern WC1 and the third wavelength band light L3 emitted from the second wavelength conversion pattern WC2 may be unpolarized. In this specification, the term "unpolarized light" means light that is not composed of only a polarization component in a specific direction, i.e. light that is not polarized in only a specific direction, that is, light that is composed of a random polarization component. Examples of unpolarized light may include natural light.

As another example, the first wavelength conversion pattern WC1 and the second wavelength conversion pattern WC2 may include a fluorescent substance, a quantum rod, or a phosphor material in addition to the first quantum dot and the second quantum dot. Here, the fluorescent substance may include yellow, green, and red fluorescent materials.

The wavelength conversion pattern WC is disposed to overlap with the light-transmitting pattern TC horizontally to the lower substrate 110. The wavelength conversion pattern WC may be disposed at both side surfaces of the light-transmitting pattern TC. In an example embodiment, as shown in FIG. 4, the first wavelength conversion pattern WC1 may be disposed on the right side of the light-transmitting pattern TC, and the second wavelength conversion pattern WC2 may be disposed on the left side of the light-transmitting pattern TC. However, the present disclosure is not limited thereto, and the disposition order may be changed.

The first wavelength conversion pattern WC1 and the second wavelength conversion pattern WC2 of the wavelength conversion pattern WC includes first surfaces WC1a and WC2a facing the planarization layer 260 and second surfaces WC1b and WC2b facing the upper substrate 210. The first surface WC1a of the first wavelength conversion pattern WC1 may be aligned substantially coplanar with the first surface WC2a of the second wavelength conversion pattern WC2. Further, the first surface WC1a of the first wavelength conversion pattern WC1 and the first surface WC2a of the second wavelength conversion pattern WC2 may be substantially aligned with a first surface TCa of the light-transmitting pattern TC.

The side surface of the first wavelength conversion pattern WC1 may be disposed to be inclined with respect to the upper substrate 210. Referring to FIG. 4, in the cross-sectional view, the width of the first wavelength conversion pattern WC1 may gradually decrease in a direction from the upper substrate 210 toward the planarization layer 260. That is, the first surface WC1a of the first wavelength conversion pattern WC1 has a smaller width than the second surface WC1b, and thus the first wavelength conversion pattern WC1 may have a trapezoidal shape. Accordingly, the first surface WC1a of the first wavelength conversion pattern WC1 may have a smaller area than the second surface WC1b.

The slope of the side surface of the first wavelength conversion pattern WC1 may have an inclination angle in the same range as that of the side surface of the light-transmitting pattern TC, from the same viewpoint as the light-transmitting pattern TC. That is, when the slope of the side surface of the first wavelength conversion pattern WC1 is in a range from 50° to 90°, it is possible to increase the area on which the light L1 is incident by increasing the area of the first surface WC2a of the second wavelength conversion pattern WC2 in a given pixel size. The slope of the side surface of the first wavelength conversion pattern WC1 may be smaller than the slope of the side surface of the light-transmitting pattern TC. However, the present disclosure is not limited thereto, and the slope of the side surface of the first wavelength conversion pattern WC1 may be substantially equal to the slope of the side surface of the light-transmitting pattern TC.

Also, a side surface of the second wavelength conversion pattern WC2 may be disposed to be inclined with respect to the upper substrate 210. As an example, the slope of the side surface of the second wavelength conversion pattern WC2 may be determined by the slope of a side surface of the second black matrix 240, which will be described below. This may be a result caused by a manufacturing process of forming the second black matrix 240 and then forming the second wavelength conversion pattern WC2.

One side surface adjacent to the side surface of the first wavelength conversion pattern WC1 among several side surfaces of the second wavelength conversion pattern WC2 may be inclined in a direction opposite to the side surface of the first wavelength conversion pattern WC1. That is, when the side surface of the first wavelength conversion pattern WC1 has an inclination angle less than or equal to 90° with respect to the side surface of the first wavelength conversion pattern WC1, the one side surface of the second wavelength conversion pattern WC2 may be inclined at 90° or greater. In addition, it may also be the same with the other side surface adjacent to the light-transmitting pattern TC among several side surfaces of the second wavelength conversion pattern WC2. That is, when the side surface of the light-transmitting pattern TC has an inclination angle less than or equal to 90°, the other surface of the second wavelength conversion pattern WC2 may have an inclination angle greater than or equal to 90°.

The first surface WC2a of the second wavelength conversion pattern WC2 may have a greater width than the second surface WC2b. The cross-sectional shape of the second wavelength conversion pattern WC2 may be trapezoidal having a width increasing in a direction toward the planarization layer 260 from the upper substrate 210. While the light-transmitting pattern TC and the first wavelength conversion pattern WC1 may have a trapezoidal shape having a width decreasing toward the planarization layer 260, the second wavelength conversion pattern WC2 may have a trapezoidal shape having a width increasing toward the planarization layer 260.

The first surface WC2a of the second wavelength conversion pattern WC2 may have a larger area than the first surface WC1a of the first wavelength conversion pattern WC1 (i.e. the area of the first surface WC2a of the second wavelength conversion pattern WC2>the area of the first surface WC1a of the first wavelength conversion pattern WC1). Also, the first surface WC2a of the second wavelength conversion pattern WC2 may have a larger area than the first surface TCa of the light-transmitting pattern TC (i.e. the area of the first surface WC2a of the second wavelength conversion pattern WC2>the area of the first surface TCa of the light-transmitting pattern TC). However, the present disclosure is not limited thereto, and the first surface WC2a of the second wavelength conversion pattern WC2 may have an area substantially similar to that of the first surface WC1a of the first wavelength conversion pattern WC1 and/or that of the first surface TCa of the light-transmitting pattern TC.

The areas of the first surfaces TCa, WC1a, and WC2a of the light-transmitting pattern TC, the first wavelength conversion pattern WC1, and the second wavelength conversion pattern WC2 may be determined according to a color coordinate target. For example, when blue light is emitted from the backlight unit 20, the light-transmitting pattern TC transmits the blue light without wavelength conversion. Thus, it is possible to maintain sufficient coloring efficiency even when the first surface TCa of the light-transmitting pattern TC on which light is incident has a smaller area than the other patterns. On the other hand, when the light-transmitting pattern TC converts the light having a wavelength indicating the blue light into light having a wavelength indicating light of a different color, more light may be needed. In this case, in order to increase the amount of light incident on the wavelength conversion pattern WC, the first surface of the wavelength conversion pattern WC may have a larger area than the first surface of the light-transmitting pattern TC.

In this regard, the ratio of the area of the first surface TCa of the light-transmitting pattern TC to the area of the first surface WC1a of the first wavelength conversion pattern WC1 may be in a range from 1:1 to 1:2.5, and the first surface WC1a of the first wavelength conversion pattern WC1 may have a larger area than the first surface TCa of the light-transmitting pattern TC. In an embodiment, the ratio of the area of the first surface TCa of the light-transmitting pattern TC to the area of the first surface WC2a of the second wavelength conversion pattern WC2 may be in a range from 1:1 to 1:3.5, and the first surface WC2a of the second wavelength conversion pattern WC2 may have a larger area than the first surface TCa of the light-transmitting pattern TC. As an example, the ratio of the areas of the upper surfaces of the patterns TC, WC1, and WC2, that is, "light-transmitting pattern TC:first wavelength conversion pattern WC1:second wavelength conversion pattern WC2" may be equal to "1:2.5:3." As another example, the ratio of the areas of the upper surfaces of the patterns TC, WC1, and WC2, that is, "light-transmitting pattern TC:first wavelength conversion pattern WC1:second wavelength conversion pattern WC2" may be equal to "1:2:3.5."

When the upper surfaces of the patterns TC, WC1, and WC2 have constant lengths, the areas of the upper surfaces of the patterns TC, WC1, and WC2 may depend on the widths of the upper surfaces of the patterns TC, WC1, and WC2. When the width of the upper surface TCa of the light-transmitting pattern TC, the width of the upper surface WC1a of the first wavelength conversion pattern WC1, and the width of the upper surface WC2a of the second wavelength conversion pattern WC2 are defined as a first length w1, a second length w2, and a third length w3, respectively, the third length w3 may be greater than the first length w1 and the second length w2. That is, the third length w3 may be greater than the first length w1, and the third length w3 may be greater than the second length w2.

The second black matrix 240 may be formed on the first black matrix 230. Like the first black matrix 230, the second black matrix 240 may be disposed between a plurality of pixel units and may be configured to block light transmission to prevent or substantially prevent color crosstalk between adjacent pixel units. In addition, the second black matrix 240 may be disposed between the patterns TC, WC1, and WC2. That is, the second black matrix 240 may be disposed between the light-transmitting pattern TC and the first wavelength conversion pattern WC1, between the first wavelength conversion pattern WC1 and the second wavelength conversion pattern WC2, and between the second wavelength conversion pattern WC2 and the light-transmitting pattern TC. In this case, it is possible to more effectively prevent color crosstalk between the patterns TC, WC1, and WC2.

As an example, the second black matrix 240 may fill a valley region, i.e. a separation space between the light-transmitting pattern TC and the first wavelength conversion pattern WC1. The second black matrix 240 filling the separation space may include a first surface facing the planarization layer 260 and a second surface facing the upper substrate 210, and the first surface may be larger than the second surface. That is, since a separation distance between the first surface TCa of the light-transmitting pattern TC and the first surface WC1a of the first wavelength conversion pattern WC1 is greater than a separation distance between the second surfaces TCb and WC1b, the separation space between the light-transmitting pattern TC and the first wavelength conversion pattern WC1 may increase toward the planarization layer 260. Accordingly, the first surface of the second black matrix 240 filling the separation space between the light-transmitting pattern TC and the first wavelength conversion pattern WC1 may be wider than the second surface of the second black matrix 240.

Also, by the second black matrix 240 filling the separation space between the light-transmitting pattern TC and the wavelength conversion pattern WC, it is possible to enhance flatness of the planarization layer 260, which will be described below. For example, the second black matrix 240 may be disposed between the light-transmitting pattern TC and the first wavelength conversion pattern WC1 and formed to fill a valley between the light-transmitting pattern TC and the first wavelength conversion pattern WC1. Thus, it is possible to minimize or reduce a step height h2 formed on a first surface of the planarization layer 260 facing the second insulating layer 270. That is, since a step height h1 of a valley between the light-transmitting pattern TC and the first wavelength conversion pattern WC1 is minimized or reduced by the second black matrix 240, it is possible to minimize or reduce the step height h2 of the planarization layer 260. Here, a step height of a specific surface refers to a height difference between the lowest portion and the highest portion of the specific surface.

As an example, the first surface of the second black matrix 240 in contact with the planarization layer 260 may be substantially aligned with the first surfaces of the patterns TC, WC1, and WC2. Thus, the first surfaces of the light-transmitting pattern TC, the wavelength conversion pattern WC, and the second black matrix 240 may be aligned coplanar with each other, and thus it is possible to minimize or reduce a step height of a valley formed between the patterns TC, WC1, and WC2. Thus, it is possible to more effectively enhance flatness of the planarization layer 260, which will be described further below.

As another example, the second black matrix 240 may further extend outward to cover the first surfaces of the light-transmitting pattern TC and/or the first wavelength conversion pattern WC1. In this case, since a step height of the valley between the patterns TC, WC1, and WC2 are filled, it is possible to minimize or reduce the step height of the planarization layer 260 and also more effectively suppress a defect caused by color crosstalk.

Figure 5:
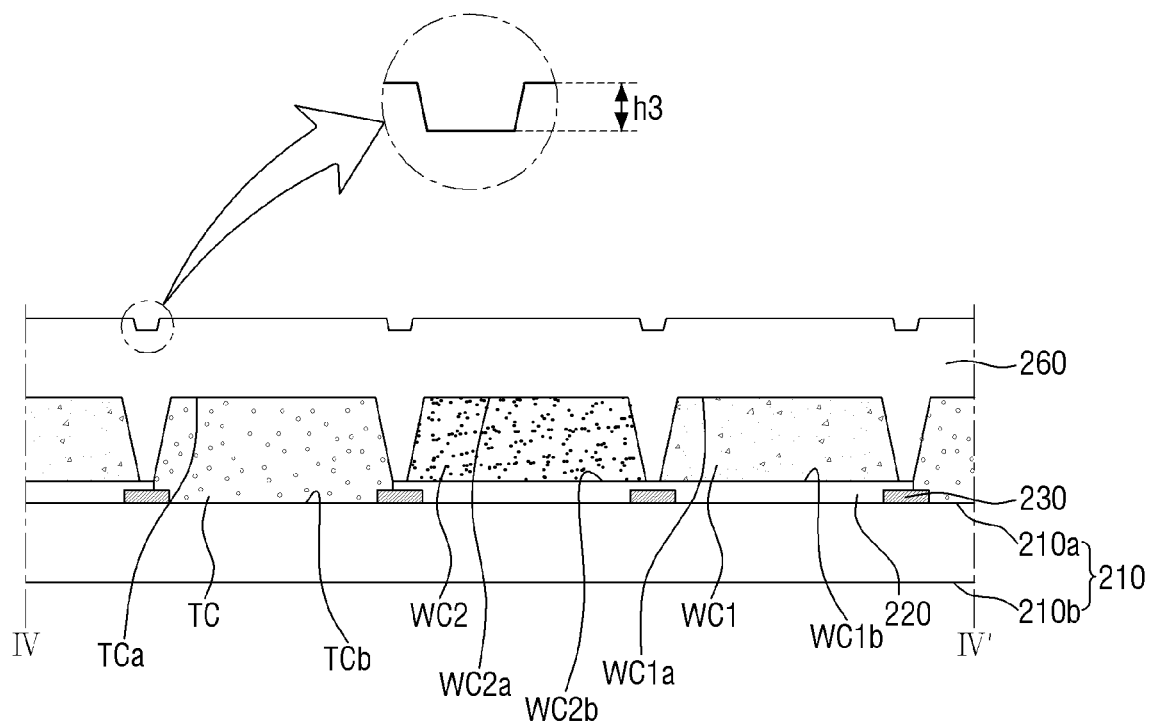
FIG. 5 is a rear view of the region "A" of FIG. 1 and also a diagram showing a case in which a second black matrix is not present.

When the second black matrix 240 is not present, as shown in FIG. 5, the planarization layer 260 is formed to fill a valley step region between the light-transmitting pattern TC and the first wavelength conversion pattern WC1.

Thus, a step height h3 formed on the first surface of the planarization layer 260 increases to the height of the valley step. Thus, the step height h3 shown in FIG. 5 may be greater than the step height h2 shown in FIG. 4.

Also, the second black matrix 240 may affect the area of the first surface WC2a of the second wavelength conversion pattern WC2. When the second black matrix 240 is not present, as shown in FIG. 5, the first wavelength conversion pattern WC1 and the second wavelength conversion pattern WC2 may be spaced apart from each other by a certain distance, thereby preventing or substantially preventing color crosstalk between the patterns TC, WC1, and WC2. In this case, the cross-sectional shape of the second wavelength conversion pattern WC2 may be trapezoidal in which the first surface facing the planarization layer 260 has a smaller width than the second surface facing the upper substrate 210

On the other hand, when the second black matrix 240 is present, as shown in FIG. 4, the second wavelength conversion pattern WC2 may be formed adjacent to the first wavelength conversion pattern WC1. That is, the second black matrix 240 can effectively prevent color crosstalk between the patterns TC, WC1, and WC2, and thus it is possible for the first wavelength conversion pattern WC1 and the second wavelength conversion pattern WC2 to be disposed with no separation space. Accordingly, the second wavelength conversion pattern WC2 may have a trapezoidal shape in which the first surface WC2a has a greater width than the second surface WC2b. As a result, it is possible to expand the area of the first surface WC2a of the second wavelength conversion pattern WC2 in a limited pixel size. Thus, it is possible to maximize or increase the amount of light incident into the second wavelength conversion pattern WC2 and thus improve light incidence efficiency. Also, along with the improvement of the light incidence efficiency, the amount of the third wavelength band light L3 converted by the second wavelength conversion pattern WC2 may increase.

In an embodiment, the planarization layer 260 may be disposed on a second low-refraction layer (not shown). The planarization layer 260 may provide flatness to a second polarization layer 280, which will be described below. That is, when the first wavelength conversion pattern WC1, the second wavelength conversion pattern WC2, and the light-transmitting pattern TC have different thicknesses during a manufacturing process or the like, the planarization layer 260 may uniformly form heights of the elements.

The material of the planarization layer 260 is not particularly limited as long as the material has planarization characteristics. As an example, the planarization layer 260 may include an organic material. For example, the organic material may include a cardo resin, a polyimide resin, an acrylic resin, a siloxane resin, a silsesquioxane resin, or the like.

The second insulating layer 270 may be disposed on the planarization layer 260. The second insulating layer 270 may be formed as at least one layer having an inorganic insulation material. As an example, the inorganic insulation material may include silicon nitride, silicon oxide, and the like. The second insulating layer 270 may prevent or substantially prevent the planarization layer 260 from being damaged during a process of forming the second polarization layer 280. Also, the second insulating layer 270 can enhance adhesion of the second polarization layer 280 and prevent or substantially prevent corrosion or damage of the second polarization layer 280 due to air or moisture. However, the second insulating layer 270 may be omitted.

The second polarization layer 280 may be disposed on the second insulating layer 270. As an example, the second polarization layer 280 may be a wire grid polarizer. Here, the second polarization layer 280 will be described as a wire grid polarizer.

In an embodiment, the second polarization layer 280 may include a plurality of linear lattice patterns. As an example, the plurality of linear grid patterns may include a conductive material through which an electric current flows. Here, as an example, the conductive material may include any of metals such as aluminum (Al), silver (Ag), gold (Au), copper (Cu), and nickel (Ni). Also, the conductive material may further include titanium (Ti) and molybdenum (Mo). As another example, the plurality of linear grid patterns may have a structure in which at least two pattern layers are stacked.

For example, when light provided to the second polarization layer 280 passes through the second polarization layer 280, components parallel to the second polarization layer 280 may be absorbed or reflected, and only components vertical to the second polarization layer 280 may be transmitted to form polarized light. As an example, the second polarization layer 280 may be formed through nanoimprinting or the like.

In an embodiment, a capping layer 281 may be disposed on the second polarization layer 280. The capping layer 281 may be directly disposed on the plurality of linear grid patterns of the second polarization layer 280 to cover and protect the plurality of linear grid patterns. The capping layer 281 may prevent or substantially prevent the second polarization layer 280 from being damaged or corroded due to air or moisture. As an example, the capping layer 281 may include an inorganic insulating material, such as silicon nitride or silicon oxide.

The common electrode CE may be disposed on the capping layer 281. The common electrode CE may be disposed to at least partially overlap with the first to third sub-pixel electrodes SPE1 to SPE3. As an example, the common electrode CE may be in the form of a plate. Also, the common electrode CE may include a plurality of slits. As an example, the common electrode CE may be formed as a transparent electrode or a semi-transparent electrode or formed of a reflective material, such as aluminum, silver, chromium, or an alloy thereof. Here, the transparent electrode or the semitransparent electrode may include one or more selected from the group consisting of indium tin oxide (ITO), indium zinc oxide (IZO), zinc oxide (ZnO), indium oxide ($In_2O_3$), indium gallium oxide (IGO), and aluminum zinc oxide (AZO).

The upper alignment film 290 may be disposed on the common electrode CE. The upper alignment film 290 may induce an initial alignment of the plurality of liquid crystal molecules 310 in the liquid crystal layer 300. As an example, the upper alignment film 290 may include an organic polymer material having an imide group in a repeating unit of a main chain.

The liquid crystal layer 300 will be described below. The liquid crystal layer 300 includes the plurality of initially aligned liquid crystal molecules 310. In an embodiment, the plurality of liquid crystal molecules 310 may have a negative dielectric anisotropy and may be vertically aligned at an initial alignment stage. The plurality of liquid crystal molecules 310 may have a predetermined pre-tilt angle at the initial alignment stage. The initial alignment of the plurality of liquid crystal molecules 310 may be induced by the lower alignment film 140 and the upper alignment film 290. When an electric field is formed between the lower display board 100 and the upper display board 200, the plurality of liquid crystal molecules 310 may be tilted or rotated in a specific direction to change a polarization state of light transmitted through the liquid crystal layer 300.

Figure 6:
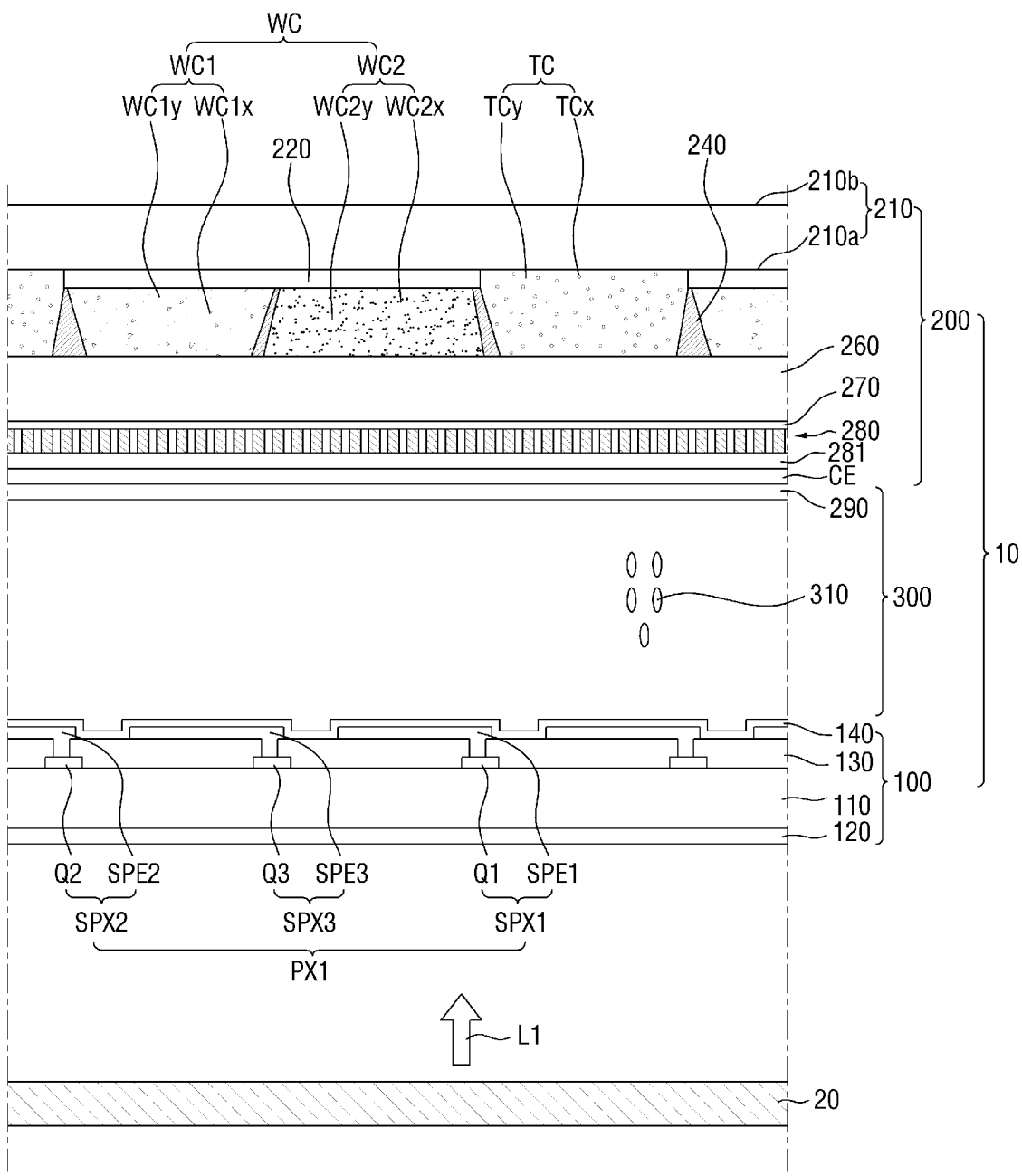
FIG. 6 is a cross-sectional view of a display device according to another embodiment.

FIG. 6 is a cross-sectional view of a display device according to another embodiment.

Referring to FIG. 6, a display device 2 according to another embodiment of the present disclosure may not include the first black matrix 230. That is, the display device 2 according to an embodiment shown in FIG. 6 is different from the display device 1 shown in FIG. 1 in that the first black matrix 230 is not included.

The first black matrix 230 may be omitted because the second black matrix 240 functions to prevent or substantially prevent color crosstalk between pixels. In this case, a process of forming the first black matrix 230 is omitted, and thus it is possible to simplify the process and reduce costs.

In addition, the color filter layer 220 may be formed to have a uniform thickness, and thus the surface of the color filter layer 220 may be smoothly formed with no step height.

The liquid crystal display devices 1 and 2 including the light-transmitting pattern TC, the wavelength conversion pattern WC, and the black matrix disposed therebetween have been described with reference to FIGS. 1 to 6. As described above, by disposing the black matrix between the light-transmitting pattern TC and the wavelength conversion pattern WC, it is possible to decrease a valley step height between the patterns TC, WC1, and the WC2. Also, by expanding the first surface of the wavelength conversion pattern WC on which light is incident, it is possible to increase efficiency of light incident on the wavelength conversion pattern WC and thus improve a color reproduction rate.

However, such a structure, that is, a structure in which the black matrix is disposed between the light-transmitting pattern TC and the wavelength conversion pattern WC may be applied to an organic light emitting display device as well as a liquid crystal display device. In this case, the planarization layer 260, the second insulating layer 270, the polarization layer, the common electrode CE, the upper alignment film 290, etc. may be omitted.

When light emitted by an organic light emitting layer is first wavelength band light L1, that is, blue light having a central wavelength in a range from 420 nm to 480 nm, the light-transmitting pattern TC, the wavelength conversion pattern WC, and the black matrix may perform the same function as in the liquid crystal display device. That is, the light-transmitting pattern TC may transmit the first wavelength band light L1 without wavelength conversion, the first wavelength conversion pattern WC1 may convert the first wavelength band light L1 into second wavelength band light L2, and the second wavelength conversion pattern WC2 may convert the first wavelength band light L1 into third wavelength band light L3.

In addition, by disposing the black matrix between the patterns TC, WC1, and WC2, it is possible to maximize or increase the area of the first surface of the first wavelength conversion pattern WC1 and/or the second wavelength conversion pattern WC2.

A manufacturing method of the display device according to an embodiment will be described below with reference to FIGS. 7 to 13.

FIGS. 7 to 13 are diagrams illustrating a manufacturing method of a display device according to an embodiment.

Figure 7:
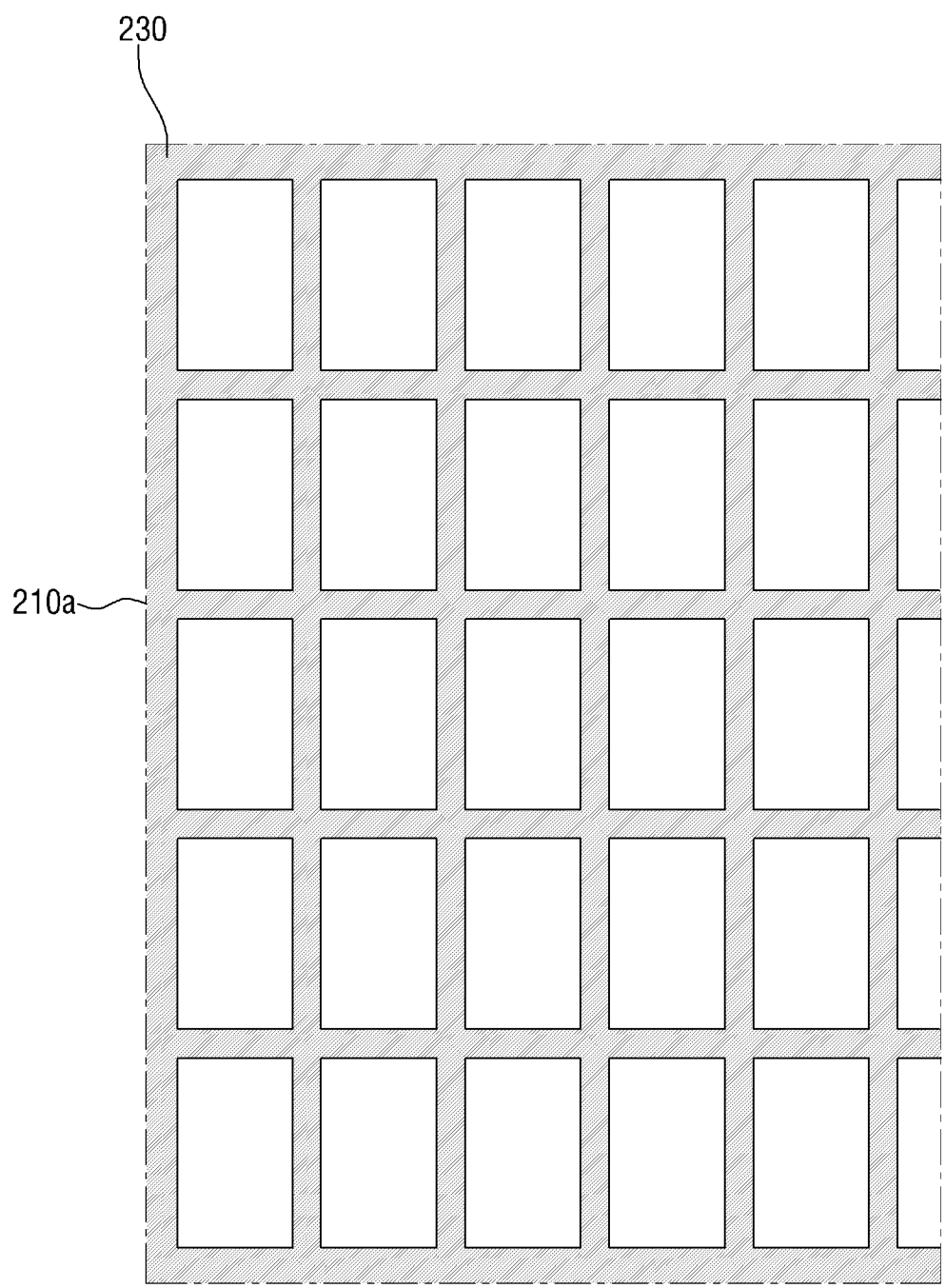
FIGS. 7 to 13 are diagrams illustrating a manufacturing method of a display device according to an embodiment.
Figure 8A:
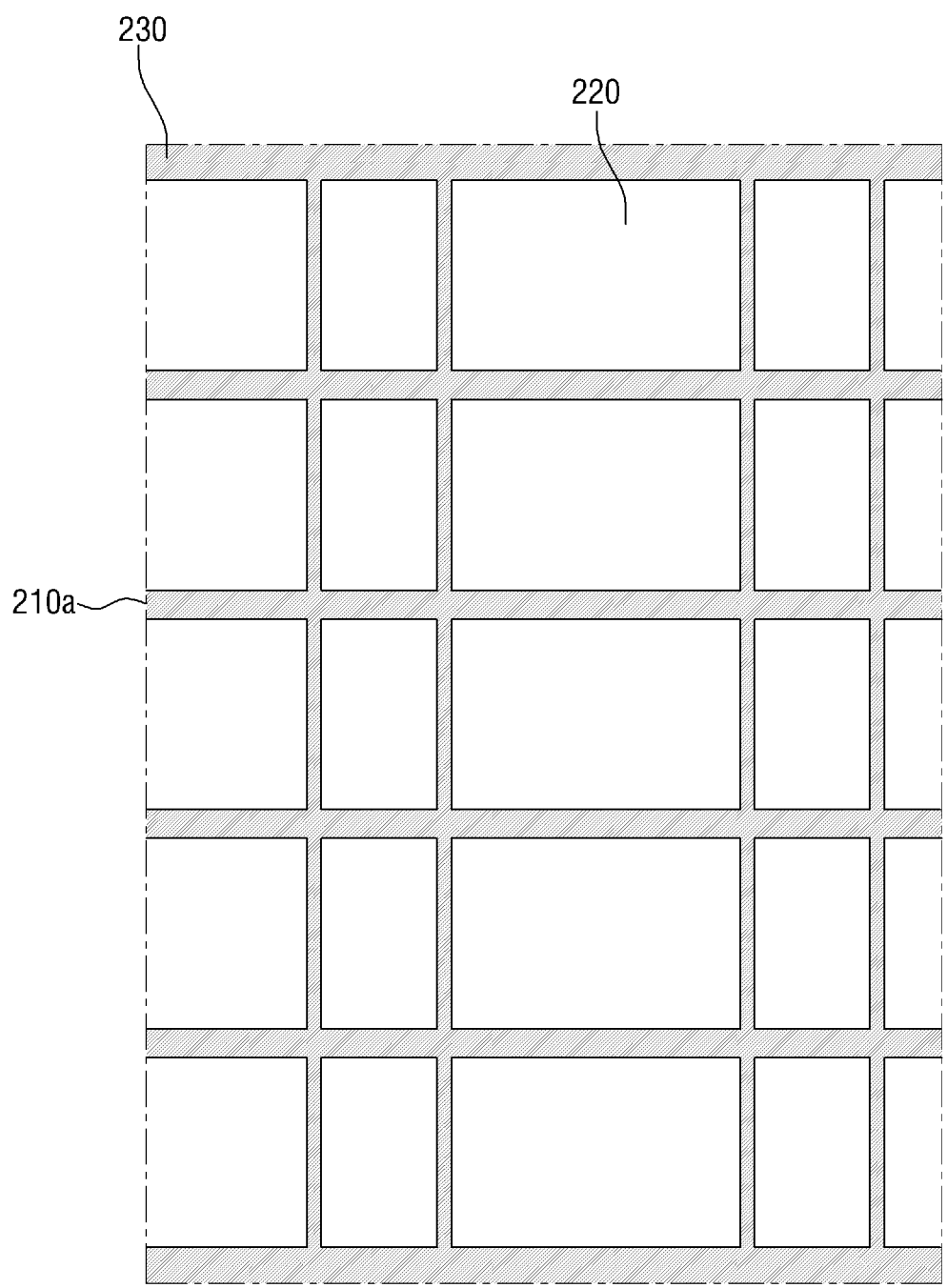
Figure 8B:
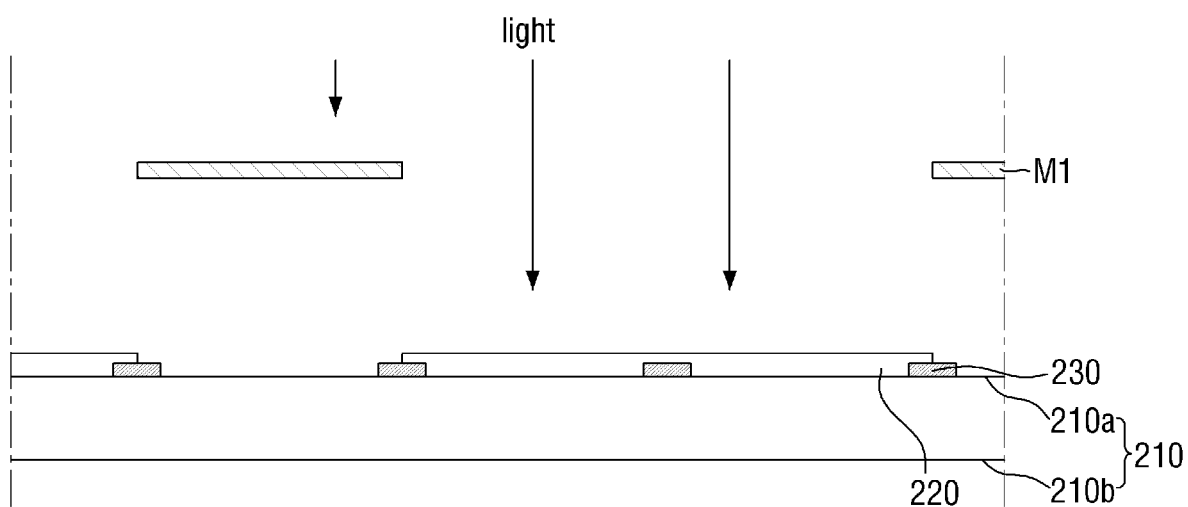

First, referring to FIGS. 7, 8A, and 8B, an upper substrate 210 on which a first black matrix 230 is formed is prepared. A color filter layer 220 is formed on the first black matrix 230 and a part of a region in which the first black matrix 230 is not formed. In more detail, the color filter layer 220 may be formed at a position overlapping with a first sub-pixel electrode SPE1 and a second sub-pixel electrode SPE2 vertically to a lower substrate 110.

As an example, the color filter layer 220 may be formed by stacking at least two layers having different refractive indices. Here, a layer having a relatively high refractive index may include TiOx, TaOx, HfOx, ZrOx, etc. Also, a layer having a relatively low refractive index may include SiOx, SiCOx, etc.

As another example, the color filter layer 220 may be formed as a single layer. In an embodiment, when the color filter layer 220 is formed as a single layer, the color filter layer 220 may be a yellow color filter. As an example, the color filter layer 220 may be formed by covering the first black matrix 230 and the entire region in which the first black matrix 230 is not formed with a yellow photoresist, radiating light to the yellow photoresist by using a first mask M1 as an exposure mask, and applying a developing solution to form a color pattern.

The yellow photoresist may include, for example, a negative photosensitive material. In this case, a portion of the yellow photoresist in which light is radiated through an opening of the first mask M1 may be cured, and the other portions may be removed by the developing solution. Thus, the color filter layer 220 may be formed in only a region overlapping with the first sub-pixel electrode SPE1 and the second sub-pixel electrode SPE2 vertically to the lower substrate 110.

A following patterning process will be described on the basis of a photolithography process performed by the above-described negative photoresist, but is not limited thereto.

Figure 9A:
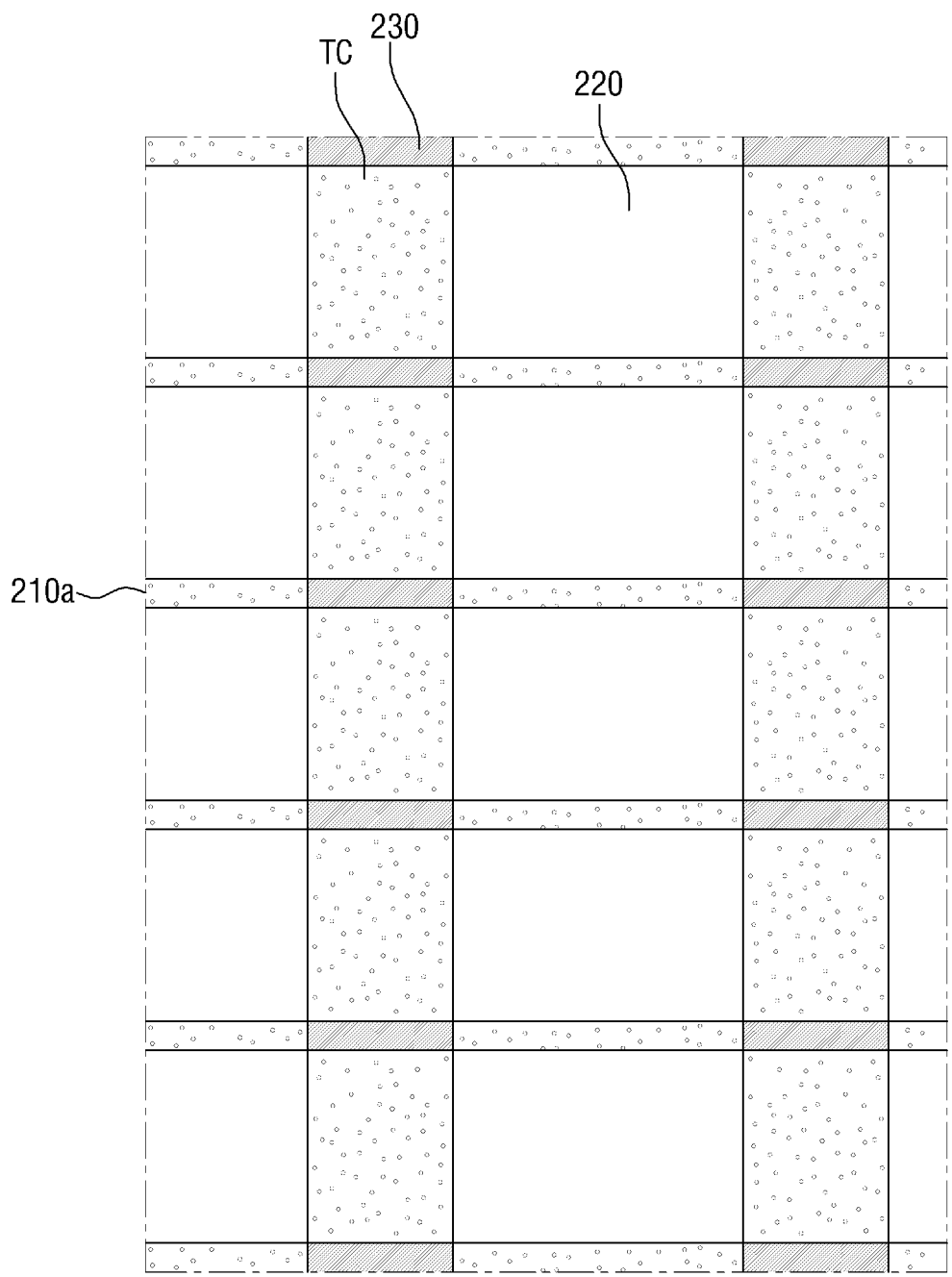
Figure 9B:
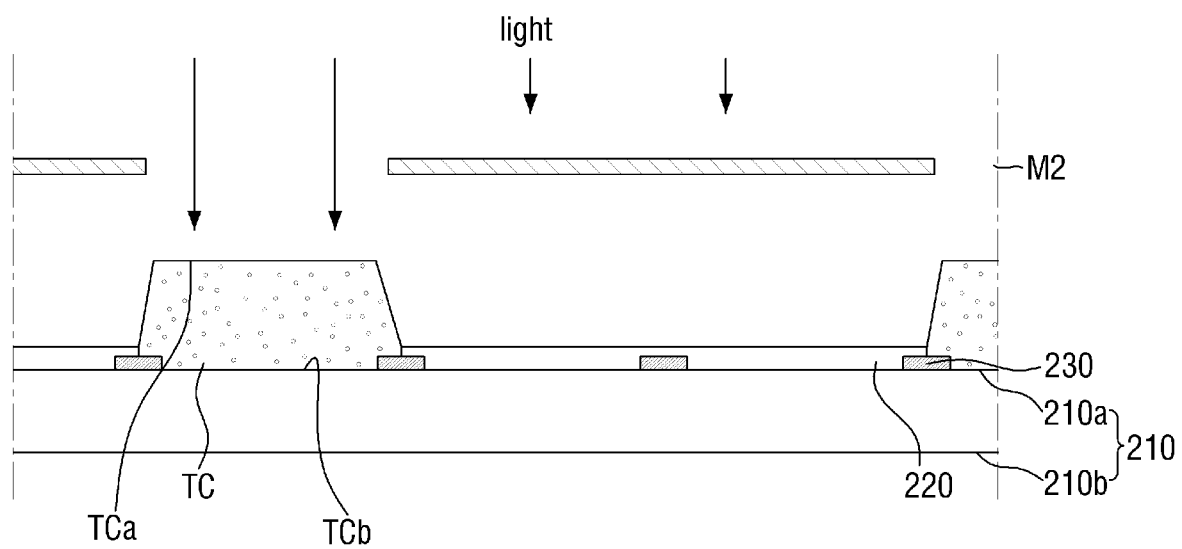

Next, referring to FIGS. 9A and 9B, a light-transmitting pattern TC is formed in a region in which the color filter layer 220 is not formed. The light-transmitting pattern TC may be formed at a position overlapping with the first sub-pixel electrode SPE1 vertically to the lower substrate 110.

The light-transmitting pattern TC may also be formed between adjacent color filter layers 220. That is, the light-transmitting pattern TC may be disposed at a long side of the color filter layer 220 disposed in a length direction of the color filter layer 220. In this case, the light-transmitting pattern TC may be formed on the first black matrix 230 and be in non-contact with the upper substrate 210.

In an embodiment, the light-transmitting pattern TC is formed by stacking a material including a light-scattering material TCx capable of diffusing light incident on a transparent organic material or a transparent photoresist and then performing a patterning process to leave only the region overlapping with the first sub-pixel electrode SPE1 vertically to the lower substrate 110 by using a second mask M2.

Figure 10A:
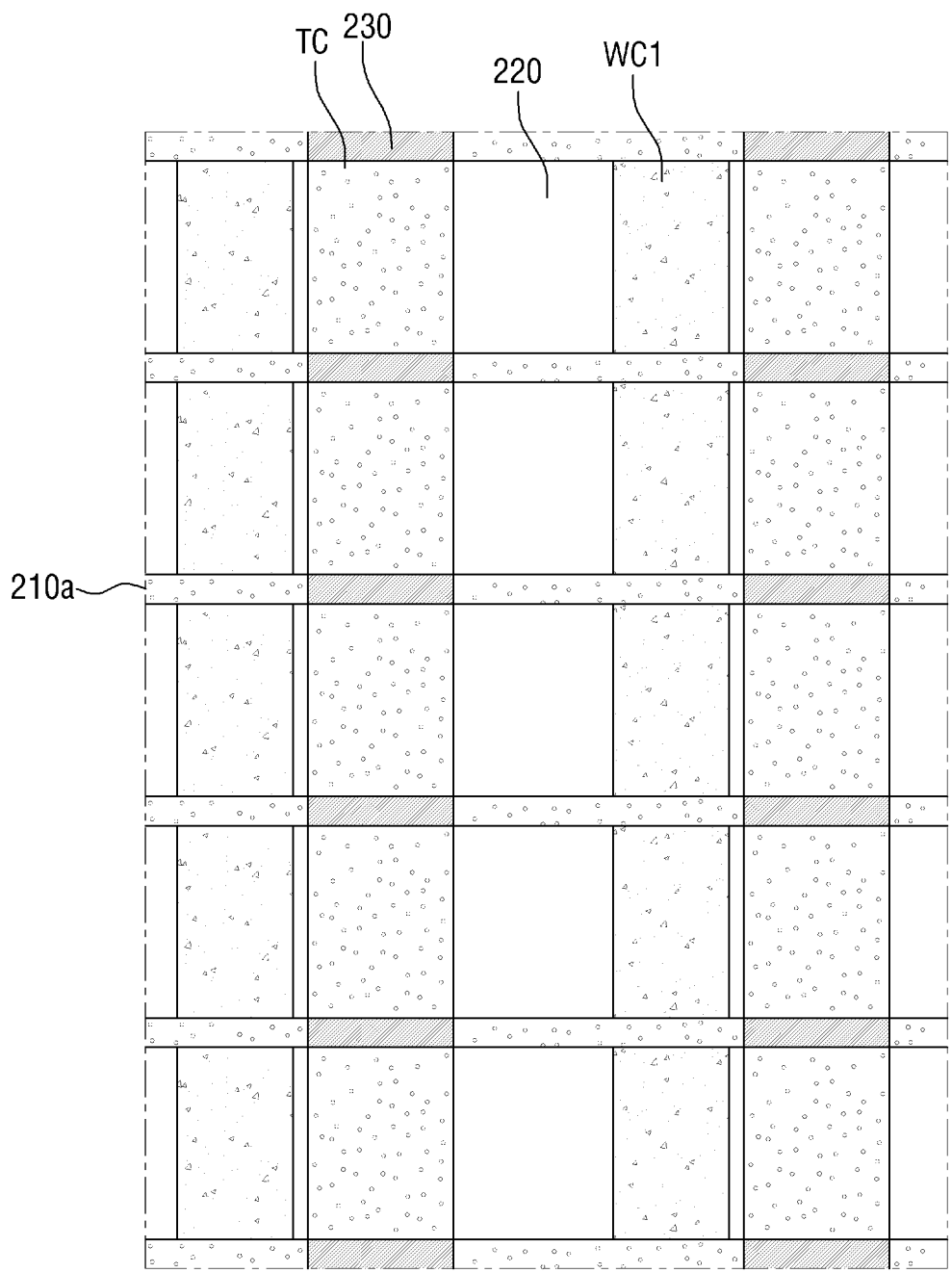
Figure 10B:
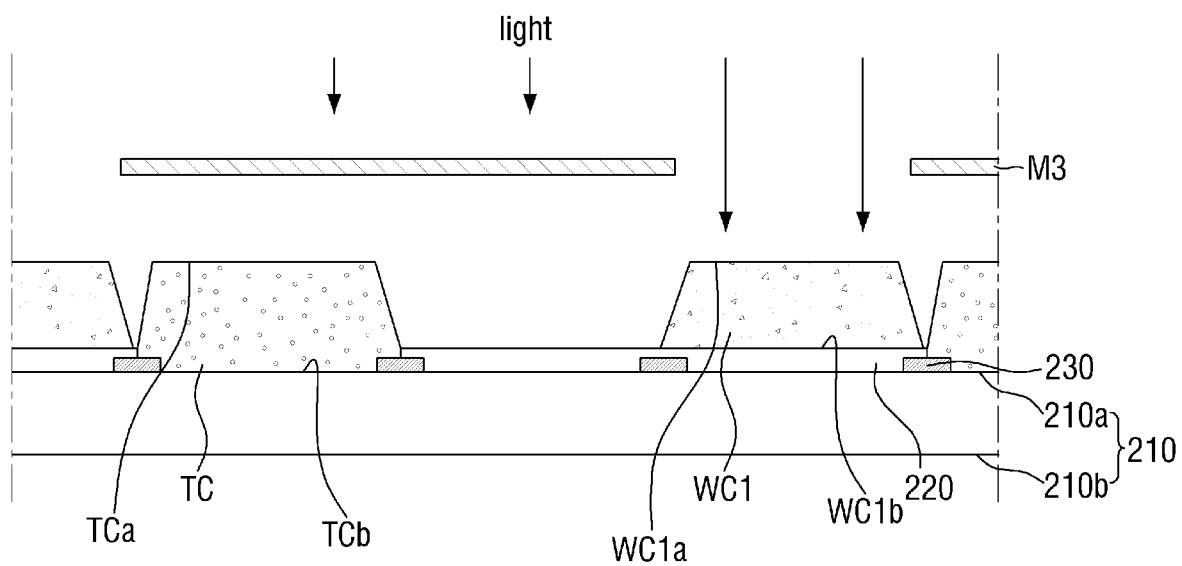

Subsequently, referring to FIGS. 10A and 10B, a first wavelength conversion pattern WC1 may be formed on the color filter layer 220. The first wavelength conversion pattern WC1 may be formed at a position overlapping with the second sub-pixel electrode SPE2 vertically to the lower substrate 110.

In an embodiment, a process of stacking a material including a plurality of first quantum dots on the transparent organic material or the transparent photoresist, radiating light to the region overlapping with the second sub-pixel electrode SPE2 vertically to the lower substrate 110 by using a third mask M3, and applying a developing solution. The first wavelength conversion pattern WC1 is formed through such a patterning process.

Figure 11A:
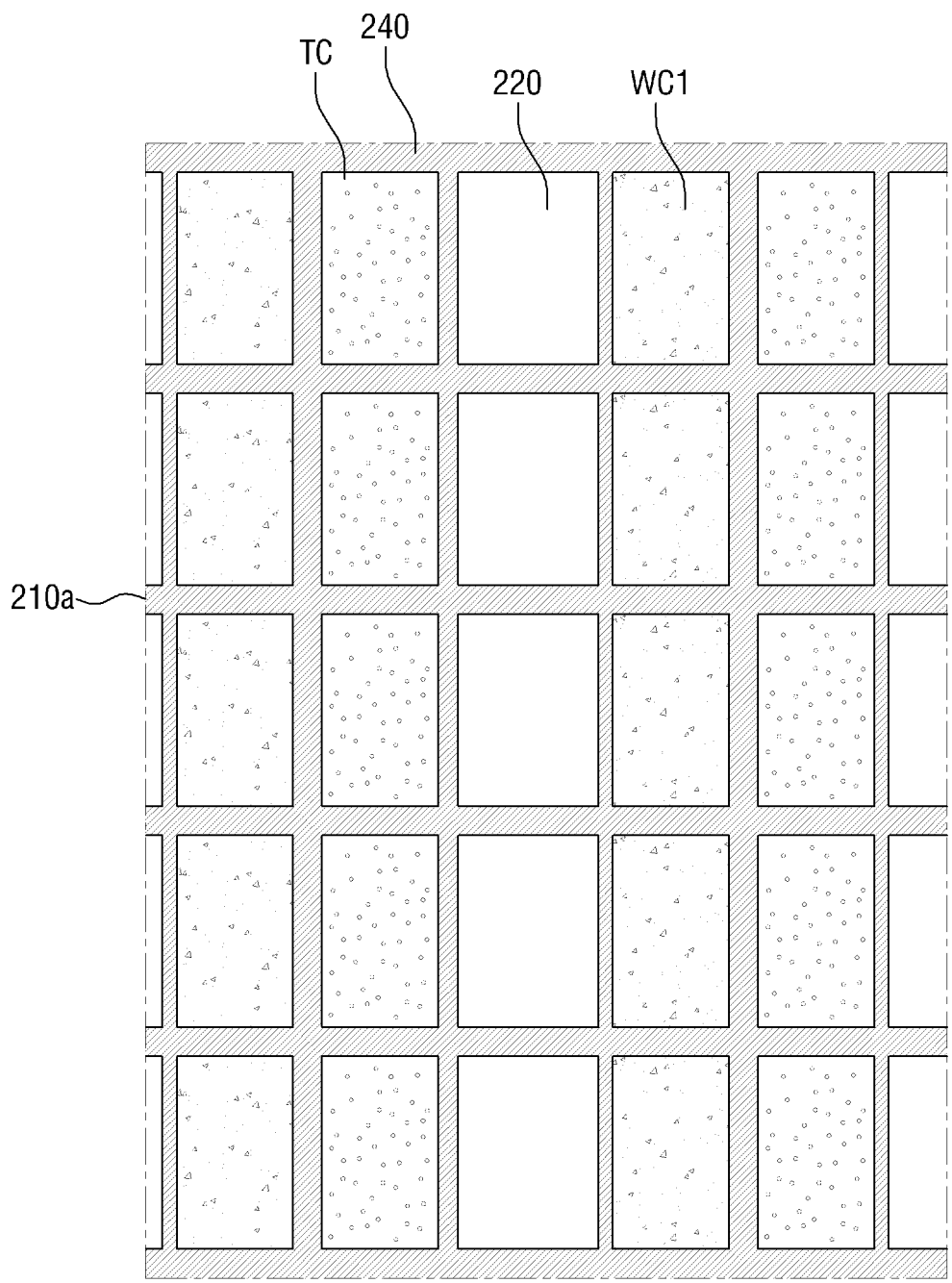
Figure 11B:
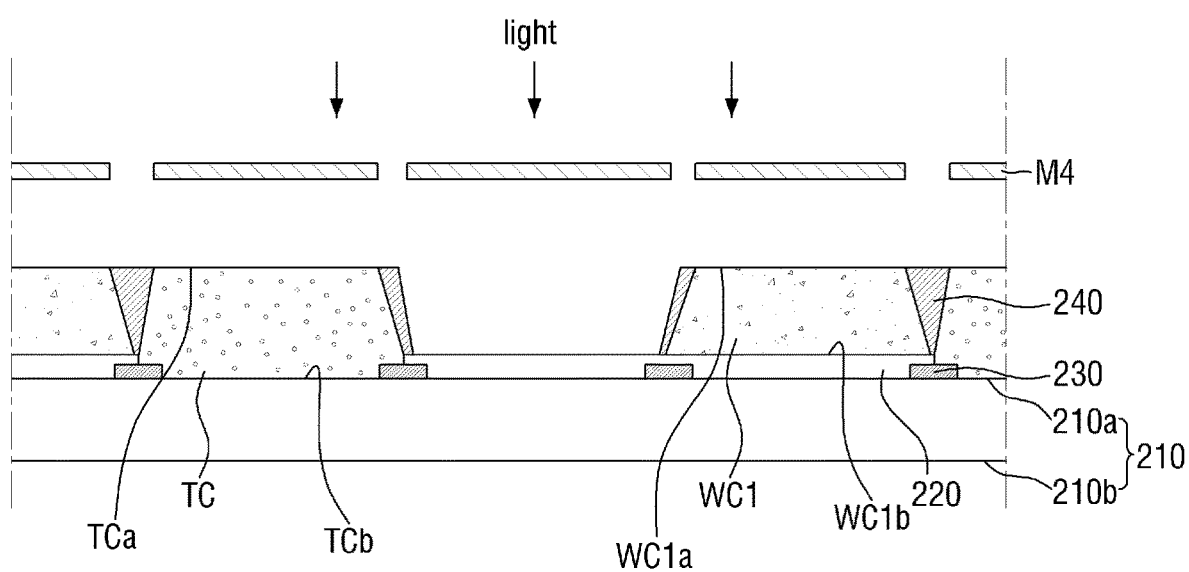

Subsequently, referring to FIGS. 11A and 11B, a second black matrix 240 is formed along a side surface of the light-transmitting pattern TC and a side surface of the first wavelength conversion pattern WC1.

The second black matrix 240 may include a light blocking composition capable of blocking light. As an example, the second black matrix 240 may be formed of a material including an organic substance. A light blocking composition including an organic substance may include a negative photosensitive material. In this case, the second black matrix 240 may be produced through a method of radiating light to the light blocking composition by using a fourth mask M4 as an exposure mask, curing the light blocking composition, and removing the other portions by using a developing solution. As an example, the light blocking composition may be applied to completely fill a valley region between the patterns TC, WC1, and WC2. That is, the light blocking composition may be applied higher than heights of the patterns, but is not limited thereto. The light blocking composition may be applied to outer side surfaces of the patterns TC, WC1, and WC2 to partially fill the valley region between the patterns TC, WC1, and WC2.

As another example, the second black matrix 240 may be formed of a metal material including chromium. In this case, the method may include depositing the metal material, forming a pattern by coating a photoresist on the metal material and then exposing the photoresist using the fourth mask M4, etching the metal material by using the pattern as a mask, and removing the photoresist pattern.

Figure 12A:
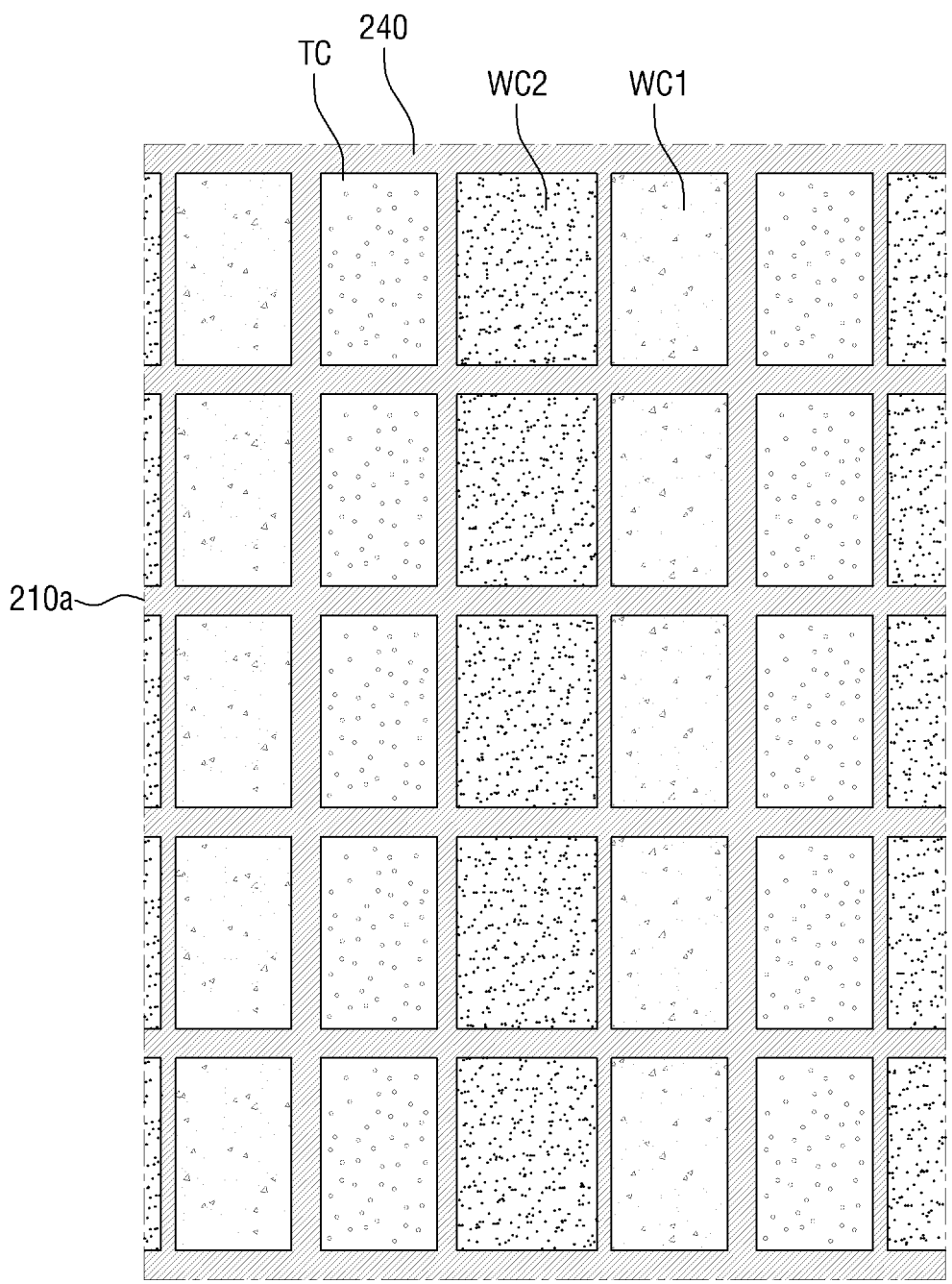
Figure 12B:
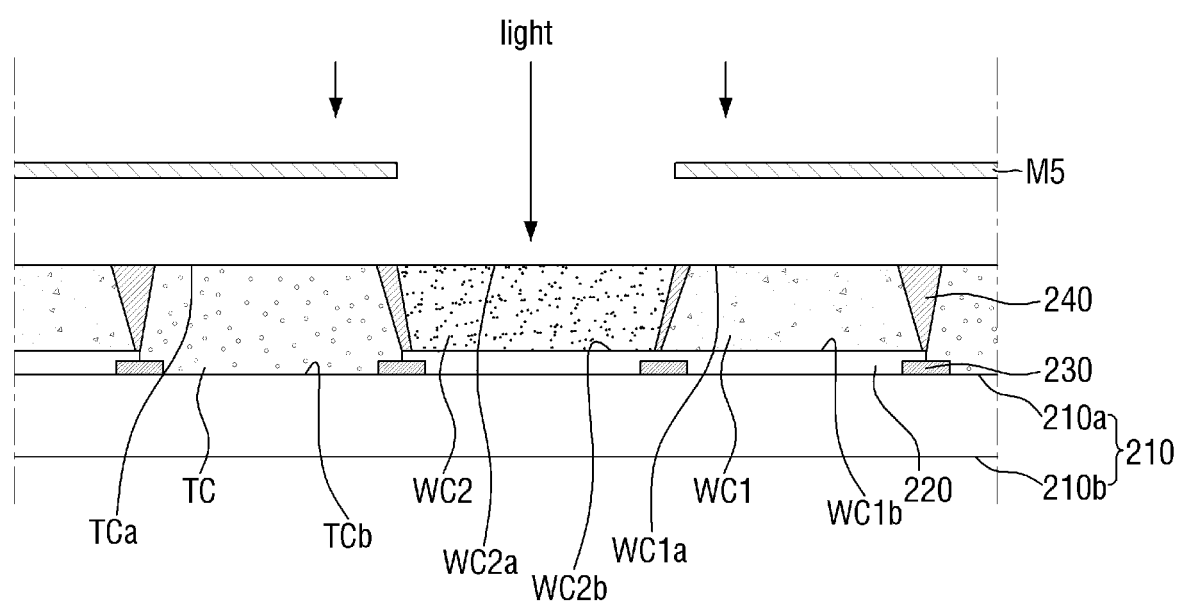

Subsequently, referring to FIGS. 12A and 12B, a second wavelength conversion pattern WC2 is formed on the color filter layer 220 in which the first wavelength conversion pattern WC1 is not formed. The side surface of the second wavelength conversion pattern WC2 is in contact with the second black matrix 240.

In an embodiment, the second wavelength conversion pattern WC2 may be formed using a transparent organic material or a transparent photoresist including a second quantum dot. In an embodiment, a manufacturing method of the second wavelength conversion pattern WC2 is the same as the manufacturing method of the first wavelength conversion pattern WC1.

The second wavelength conversion pattern WC2 may be disposed adjacent to the light-transmitting pattern TC and the first wavelength conversion pattern WC1 without a separation distance by interposing the second black matrix 240 therebetween. As a result, as described above, the first surface WC2a of the second wavelength conversion pattern WC2 may have a greater area than the second surface WC2b, and thus it is possible to secure a large light incidence area in a given pixel size.

Figure 13:
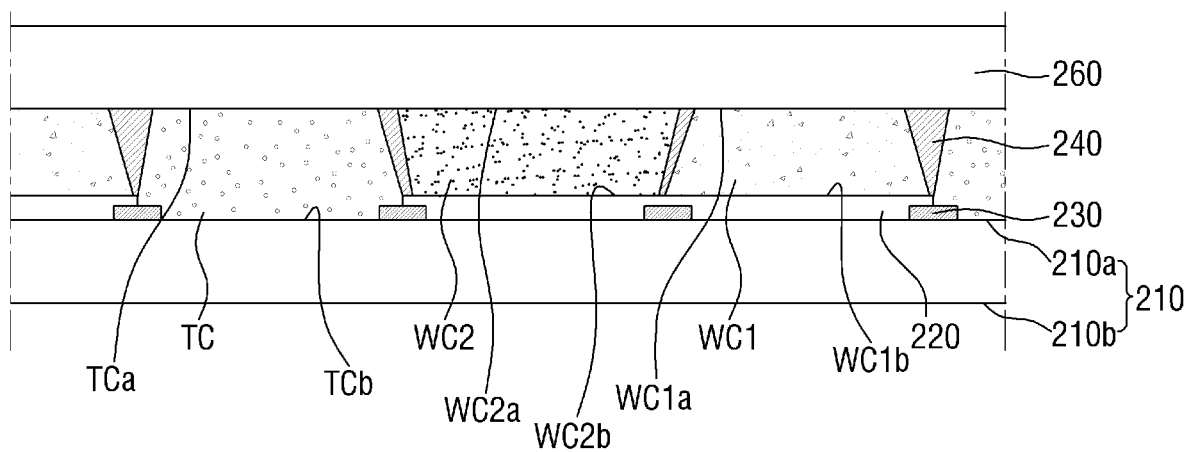

Subsequently, referring to FIG. 13, a planarization layer 260 is formed on the patterns TC, WC1, and WC2 and the second black matrix 240. As an example, the planarization layer 260 may be formed of an organic material.

As a valley region between the patterns TC, WC1, and WC2 is filled with the second black matrix 240, it is possible to minimize or reduce a step height formed on a surface of the planarization layer 260.

While some embodiments of the present disclosure have been described above with reference to the accompanying drawings, it will be understood by those skilled in the art that various changes in form and details may be made therein without departing from the spirit and scope of the disclosure as set forth in the appended claims. Therefore, the exemplary embodiments disclosed herein should be considered in an illustrative sense rather than in a restrictive sense.

What is claimed is:
1. A display device comprising:
a first substrate;
first to third sub-pixel electrodes adjacent to each other on the first substrate;
a second substrate positioned opposite to the first substrate;
a light-transmitting pattern on the second substrate and at least partially overlapping with the first sub-pixel electrode, the light-transmitting pattern including a first surface facing the first substrate and a second surface facing the second substrate;
a wavelength conversion pattern on the second substrate and including a first surface facing the first substrate and a second surface facing the second substrate, the wavelength conversion pattern including a first wavelength conversion pattern at least partially overlapping with the second sub-pixel electrode and a second wavelength conversion pattern at least partially overlapping with the third sub-pixel electrode;
a first black matrix filling a separation space between a side surface of the light-transmitting pattern and a side surface of the first wavelength conversion pattern and including a first surface facing the first substrate and a second surface facing the second substrate; and
a planarization layer on the wavelength conversion pattern, the light-transmitting pattern, and the first black matrix,
wherein the first surface of the first black matrix is wider than the second surface of the first black matrix, and
wherein the first surface of the second wavelength conversion pattern is wider than the second surface of the second wavelength conversion pattern.

2. The display device of claim 1, wherein the first wavelength conversion pattern receives first wavelength band light and converts the first wavelength band light into second wavelength band light having a different wavelength band from the first wavelength band light, and wherein the second wavelength conversion pattern receives the first wavelength band light and converts the first wavelength band light into third wavelength band light having a different wavelength band from the first and second wavelength band light.

3. The display device of claim 2, wherein the light-transmitting pattern transmits the first wavelength band light.

4. The display device of claim 2, wherein the first surface of the second wavelength conversion pattern is wider than the second surface of the second wavelength conversion pattern.

5. The display device of claim 4, wherein the first surface of the second wavelength conversion pattern is wider than the first surface of the first wavelength conversion pattern.

6. The display device of claim 4, wherein the first surface of the light-transmitting pattern is narrower than the second surface of the light-transmitting pattern.

7. The display device of claim 6, wherein the first surface of the second wavelength conversion pattern is wider than the first surface of the light-transmitting pattern.

8. The display device of claim 2, wherein the first wavelength conversion pattern and the second wavelength conversion pattern include one of a quantum dot and a fluorescent substance.

9. The display device of claim 2, wherein a side surface of the wavelength conversion pattern and the side surface of the light-transmitting pattern are inclined with respect to the second substrate.

10. The display device of claim 9, wherein the first black matrix is in contact with the side surface of the first wavelength conversion pattern and the side surface of the light-transmitting pattern.

11. The display device of claim 10, wherein the side surface of the first black matrix is inclined with respect to the second substrate.

12. The display device of claim 10, wherein the side surface of the first wavelength conversion pattern has a smaller inclination angle than the side surface of the light-transmitting pattern.

13. The display device of claim 2, further comprising a color filter layer between the wavelength conversion pattern and the second substrate, wherein the color filter layer blocks the first wavelength band light and transmits the second wavelength band light and the third wavelength band light.

14. The display device of claim 13, wherein the color filter layer is between the first black matrix and the substrate and at least partially overlaps with the wavelength conversion pattern.

15. The display device of claim 13, further comprising a second black matrix between the color filter layer and the second substrate.

16. The display device of claim 15, wherein the second black matrix overlaps with the first black matrix.

17. The display device of claim 2, wherein the first surface of the wavelength conversion pattern, the first surface of the light-transmitting pattern, and the first surface of the first black matrix are aligned substantially coplanar with each other.

18. A method of manufacturing a display device, the method comprising:

forming a light-transmitting pattern configured to transmit first wavelength band light on a substrate;

forming a first wavelength conversion pattern on the substrate not to overlap with the light-transmitting pattern and configured to receive the first wavelength band light and convert the first wavelength band light into second wavelength band light having a different wavelength band from the first wavelength band light;

forming a black matrix to fill a separation space between a side surface of the light-transmitting pattern and a side surface of the first wavelength conversion pattern; and forming a second wavelength conversion pattern between the light-transmitting pattern and the first wavelength conversion pattern and configured to receive the first wavelength band light and convert the first wavelength band light into third wavelength band light having a different wavelength band from the first wavelength band light and the second wavelength band light, wherein the second wavelength conversion pattern includes a first surface facing the substrate and a second surface opposite to the first surface, and wherein the second surface is wider than the first surface.

19. The method of claim 18, wherein the black matrix includes a first surface facing the substrate and a second surface opposite the first surface, and the second surface is wider than the first surface.

20. The method of claim 18, further comprising a color filter layer between the first and second wavelength conversion patterns and the substrate.

* * * * *